United States Patent
Emadi et al.

(10) Patent No.: US 9,641,119 B2
(45) Date of Patent: May 2, 2017

(54) EXTENDED-SPEED LOW-RIPPLE TORQUE CONTROL OF SWITCHED RELUCTANCE MOTOR DRIVES

(71) Applicant: McMaster University, Hamilton (CA)

(72) Inventors: Ali Emadi, Burlington (CA); Jin Ye, Hamilton (CA)

(73) Assignee: McMaster University, Hamilton (CA)

( * ) Notice: Subject to any disclaimer, the term of this patent is extended or adjusted under 35 U.S.C. 154(b) by 84 days.

(21) Appl. No.: 14/565,940

(22) Filed: Dec. 10, 2014

(65) Prior Publication Data

US 2015/0162863 A1 Jun. 11, 2015

Related U.S. Application Data

(60) Provisional application No. 61/913,942, filed on Dec. 10, 2013.

(51) Int. Cl.
*H02P 25/08* (2016.01)
*H02P 25/098* (2016.01)

(52) U.S. Cl.
CPC .......... *H02P 25/088* (2013.01); *H02P 25/098* (2016.02)

(58) Field of Classification Search
CPC .......... H02P 25/08; H02P 21/06; H02P 21/14; H02P 2203/09; H02P 2207/05; H02P 2209/07; H02P 27/06; H02P 6/006; H02P 6/08; H02P 6/085; H02P 6/10; H02P 6/18; H02P 21/141; H02P 23/0086; H02P 23/30
USPC ............ 318/135, 254.1, 400.02, 400.15, 685
See application file for complete search history.

(56) References Cited

U.S. PATENT DOCUMENTS

| | | | | |
|---|---|---|---|---|
| 4,933,620 A | * | 6/1990 | MacMinn | ............... H02P 25/08 318/685 |
| 5,012,171 A | * | 4/1991 | Sember | ................... H02P 25/08 318/685 |
| 6,853,158 B2 | * | 2/2005 | Tan | ......................... H02P 6/006 318/135 |

(Continued)

FOREIGN PATENT DOCUMENTS

EP 1617554 B1 6/2009

OTHER PUBLICATIONS

Krishnan, "Switched Reluctance Motor drives: Modeling, Simulation, Analysis Design, and Applications", Boca Raton, FL: CRC Press, Jun. 2001.

(Continued)

*Primary Examiner* — Paul Ip
(74) *Attorney, Agent, or Firm* — Bereskin & Parr LLP/S.E.N.C.R.L., s.r.l.

(57) ABSTRACT

Various embodiments are described herein for an extended-speed low-ripple torque control of a switched reluctance motor (SRM) using online torque sharing function (TSF). Two operational modes of an online TSF are defined during the commutation: In Mode I, absolute value of rate of change of flux linkage (ARCFL) of incoming phase is higher than outgoing phase; in Mode II, ARCFL of outgoing phase is higher than incoming phase. To compensate the torque error produced by imperfect tracking of phase current, a proportional and integral compensator with torque error is added to the torque reference of outgoing phase in Mode I and incoming phase in Mode II. Therefore, the total torque is determined by the phase with lower ARCFL rather than the phase with higher ARCFL as in conventional TSFs.

11 Claims, 29 Drawing Sheets

(56) References Cited

U.S. PATENT DOCUMENTS

| | | | | |
|---|---|---|---|---|
| 7,772,790 | B2* | 8/2010 | Nashiki | H02K 1/145 318/400.02 |
| 7,960,931 | B2* | 6/2011 | Rodriguez | H02P 6/085 318/432 |
| 8,080,969 | B2 | 12/2011 | Koenig | |
| 8,441,223 | B2 | 5/2013 | Ahn et al. | |
| 2002/0063539 | A1* | 5/2002 | Tan | H02P 6/10 318/135 |
| 2006/0069481 | A1* | 3/2006 | Kubota | B62D 5/0463 701/41 |
| 2008/0116842 | A1* | 5/2008 | Cheng | B60L 15/025 318/807 |
| 2008/0129243 | A1* | 6/2008 | Nashiki | H02K 1/145 318/701 |
| 2009/0009113 | A1* | 1/2009 | Rodriguez | H02P 6/085 318/400.15 |
| 2012/0104986 | A1* | 5/2012 | Ahn | H02P 23/0086 318/701 |
| 2012/0169267 | A1* | 7/2012 | Nashiki | H02K 19/103 318/701 |
| 2013/0088179 | A1* | 4/2013 | Kobayashi | H02P 21/141 318/400.02 |

OTHER PUBLICATIONS

Miller, "Electronic Control of Switched Reluctance Machines", New York: Reed Education and Professional, 2001.
Krishnamurthy et al., "Making the case for applications of switched reluctance motor technology in automotive products", IEEE Trans Power Electron., vol. 21, No. 3, pp. 659-675, May 2006.
Desai et al., "Novel switched reluctance machine configuration with higher number of rotor poles than stator poles: concept to implementation", IEEE Trans. Ind. Electron., vol. 57, No. 2, pp. 649-659, Feb. 2010.
Shamsi et al., "Single-bus star-connected switched reluctance drive", IEEE Trans. Power Electron, vol. 28, No. 12, pp. 5578-5587, Dec. 2013.
Bilgin et al, "Design consideration for switched reluctance machines with higher number of rotor poles", IEEE Trans. Ind. Electron, vol. 59, No. 10, pp. 3745-3756, Apr. 2012.
Bilgin et al., "Comprehensive evaluation of the dynamic performance of a 6/10 SRM for traction application in PHEV's", IEEE Trans. Ind. Electron, vol. 60, No. 7, pp. 2564-2575, Jul. 2013.
Cao et al., "Independent control of average torque and radical force in bearingless switched-reluctance motors with hybrid excitations", IEEE Trans. Power Electron, vol. 24, No. 5, pp. 1376-1385, May 2009.
Ye et al., "Comparative evaluation of power converters for 6/4 and 6/10 switched reluctance machines", in Proc. IEEE Transportation Electrification Conference and Expo, 2012, Dearborn, MI, pp. 1-6.
Shao et al., "A digital PWM control of switched reluctance motor drives", in Proc, IEEE Vehicular Power and Propulsion, 2010, Lillie, France, pp. 1-6.
Cai et al., "Sensorless control of switched reluctance motor based on phase inductance vectors", IEEE Trans Power Electron., vol. 27, No. 7, pp. 3410-3423, Jul. 2012.
Hennen et al., "Development and control of an integrated and distributed inverter for a fault tolerant five-phase switched reluctance traction drive", IEEE Trans. Power Electron, vol. 27, No. 2, pp. 547-554, Feb. 2012.
Tseng et al., "Development of a self-tuning TSK-fuzzy speed control strategy for switched reluctance motor", IEEE Trans. Power Electron., vol. 27, No. 4, pp. 2141-2152, Apr. 2012.
Torkaman et al., "Comprehensive detection of eccentricity fault in switched reluctance machines using high-frequency pulse injection", IEEE Trans. Power Electron., vol. 28, No. 3, pp. 1382-1390, Mar. 2013.
Lee et al., "Design and operation characteristics of four-two pole high-speed SRM for torque ripple reduction", IEEE Trans. Ind. Electron., vol. 60, No. 9, pp. 3637-3643, Sep. 2013.
Kim et al., "Single-controllable-switch-based switched reluctance motor drive for low cost, variable-speed applications", IEEE Trans., Power Electron, vol. 27, No. 1, pp. 379-387, Jan. 2012.
Mikail et al., "Four-quadrant torque ripple minimization of switched reluctance machine through current profiling with mitigation of rotor eccentricity problem and sensor errors", in Proc. IEEE Energy Convers Congress Expo., 2012, Raleigh, NC, pp. 838-842.
Mikail et al., "Torque-ripple minimization of switched reluctance machines through current profiling", IEEE Trans Ind. Appl., vol. 49, No. 3, pp. 1258-1267, May/Jun. 2013.
Sahoo et al., "A Lyapunov function based robust direct torque controller for a switched reluctance motor drive system", IEEE Trans. Power Electron., vol. 27, No. 2, pp. 555-564, Feb. 2012.
Husain et al., "Modeling, simulation, and control of switched reluctance motor drives", IEEE Trans. Ind. Electron. vol. 52, No. 6, pp. 1625-1634, May 2005.
Husain, "Minimization of torque ripple in SRM drive", IEEE Trans. Ind. Electron, vol. 49, No. 1, pp. 28-39, Feb. 2002.
Pan et al., "An improved force distribution function for linear switched reluctance motor on force ripple minimization with non-linear inductance modeling", IEEE Trans Magn., vol. 48, No. 11, pp. 3064-3067, Nov. 2012.
Brauer et al., "Control for polyphase switched reluctance machines to minimize torque ripple and decrease ohmic machine losses", IEEE Trans. Power Electron, vol. 27, No. 1, pp. 370-378, Feb. 2012.
Xue et al., "Optimization and evaluation of torque sharing function for torque ripple minimization in switched reluctance motor drives", IEEE Trans. Power Electron., vol. 24, No. 9, pp. 2076-2090, Sep. 2009.
Vujicic, "Minimization of torque ripple and copper losses in switched reluctance drive", IEEE Trans. Power Electron, vol. 27, No. 1, pp. 388-399, Jan. 2012.
Lee et al., "A simple nonlinear logical torque sharing function for low-torque ripple SR Drive", IEEE Trans. Ind. Electron, vol. 56, No. 8, pp. 3021-3028, Aug. 2009.
Sahoo et al., "Indirect torque control of switched reluctance motors using iterative learning control", IEEE Trans. Power Electron, vol. 20, No. 1, pp. 200-208, Jan. 2005.
Sahoo et al., "Iterative learning-based high-performance current controller for switched reluctance motors", IEEE Trans. Energy Convers, vol. 19, No. 3, pp. 491-498, Sep. 2004.
Chayopitak et al., "An online low-ripple torque control of switched reluctance motor for small electric vehicle", in Proc. International Conference on Electrical Machines and Systems, 2008, Wuhan, China, pp. 3327-3332.
JSOL Corporation, JMAG, Application Note, 2013 (online), http://www.jmag-international.com/.
Vujicic, "Modeling of a switched reluctance machine based on the invertible torque function", IEEE Trans. Magn. vol. 44, No. 9, pp. 2186-2194, Sep. 2008.

* cited by examiner

CH1: Phase A torque response (2 Nm/div); CH2: Phase B torque response (2 Nm/div); CH3: Torque (1 Nm/div); CH4: Phase C torque response (2Nm/div)

CH1: Phase A torque response (2 Nm/div); CH2: Phase B torque response (2 Nm/div); CH3: Torque (1 Nm/div); CH4: Phase C torque response (2Nm/div)

EXTENDED-SPEED LOW-RIPPLE TORQUE CONTROL OF SWITCHED RELUCTANCE MOTOR DRIVES

CROSS-REFERENCE TO RELATED APPLICATION

This application claims the benefit of United States Provisional Patent Application No. 61/913,942 filed Dec. 10, 2013, the contents of which are incorporated herein by reference.

TECHNICAL FIELD

The described embodiments relate generally to torque control of a switched reluctance motor, and in particular, to torque control of a switched reluctance motor using a torque sharing function technique.

BACKGROUND

A switched reluctance motor is a type of synchronous AC machine that converts reluctance torque into mechanical power. Switched reluctance motors are emerging as a promising candidate in automotive applications due to the absence of windings in the rotor, four-quadrant operation, and extended constant power speed range. However, torque pulsations or torque ripples, acoustic noise and vibration issues are inherent disadvantages of conventional switched reluctance motors.

SUMMARY

In one aspect, at least one embodiment described herein provides a switched reluctance motor system comprising a switched reluctance motor and a torque control system coupled to the switched reluctance motor. The torque control system is configured to detect a torque error between an overall torque reference and an overall torque response of the switched reluctance motor, and compensate for the torque error by controlling a torque reference of a first phase based on imperfect tracking of torque reference of a second phase.

In various embodiments, the torque control system is configured to compensate for the torque error by controlling the torque reference of a phase with a lower maximum absolute value of rate of change of flux linkage or ARCFL.

In various embodiments, the torque control system is configured to operate in two modes, where the torque control system operates in a first mode towards the start of commutation and operates in a second mode towards the end of commutation.

In various embodiments, in the first mode, the ARCFL of outgoing phase is lower than the ARCFL of incoming phase, and in the second mode, the ARCFL of incoming phase is lower than the ARCFL of outgoing phase.

In various embodiments, in the first mode, the torque control system is configured to compensate for the torque error by controlling the torque reference of the outgoing phase and in the second mode, the torque control system is configured to compensate for the torque error by controlling the torque reference of the incoming phase.

In some embodiments, in the first mode, the torque control system is configured to compensate for the torque error by adding a compensation torque reference corresponding to the torque error to the torque reference of the outgoing phase.

In some embodiments, in the second mode, the torque control system is configured to compensate for the torque error by adding a compensation torque reference corresponding to the torque error to the torque reference of the incoming phase.

In various embodiments, the torque control system comprises a compensator configured to generate a compensation torque reference based on the torque error, where the compensation torque reference is used to control the torque reference of the first phase. In some embodiments, the compensator is a proportional and integral ('PI') compensator.

In various embodiments, the torque control system further comprises a summer coupled to the compensator, the summer being configured to combine the compensation torque reference with a torque reference of the first phase to generate a new torque reference for the first phase.

In various embodiments, the torque control system further comprises a first phase torque generator for generating a torque response based on the new torque reference for the first phase.

In various embodiments, the torque control system further comprises a second phase torque generator for generating a torque response for the second phase based on a torque reference of the second phase.

In various embodiments, the torque control system comprises a feed-forward system configured to receive the overall torque reference of the switched reluctance motor, and generate a first torque reference corresponding to the first phase and a second torque reference corresponding to the second phase.

In various embodiments, the torque control system comprises a feedback system configured to provide the overall torque response of the switched reluctance motor to the torque control system to generate the torque error.

In another aspect, in at least one embodiment described herein, there is provided a method of controlling an overall torque response of a switched reluctance motor. The method comprises providing a torque control system, the torque control system being coupled to the switched reluctance motor; detecting, at the torque control system, a torque error between an overall torque reference of the switched reluctance motor and the overall torque response; and compensating for the torque error by controlling, by the torque control system, a torque reference of a first phase based on imperfect tracking of torque reference of a second phase.

In various embodiments, the step of compensating for the torque error comprises controlling the torque reference of a phase with a lower maximum absolute value of rate of change of flux linkage or ARCFL.

In various embodiments, the torque control system is configured to operate in two modes, where the torque control system operates in a first mode towards the start of commutation and operates in a second mode towards the end of commutation.

In various embodiments, in the first mode, the ARCFL of outgoing phase is lower than the ARCFL of incoming phase, and in the second mode, the ARCFL of incoming phase is lower than the ARCFL of outgoing phase. In such embodiments, the step of compensating for the torque error comprises compensating for the torque error by controlling the torque reference of the outgoing phase in the first mode; and compensating for the torque error by controlling the torque reference of the incoming phase in the second mode.

In various embodiments, the step of controlling the torque reference of the outgoing phase comprises adding a compensation torque reference corresponding to the torque error to the torque reference of the outgoing phase.

In various embodiments, the step of controlling the torque reference of the incoming phase comprises adding a compensation torque reference corresponding to the torque error to the torque reference of the incoming phase.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and which will now be briefly described.

Figure 1:
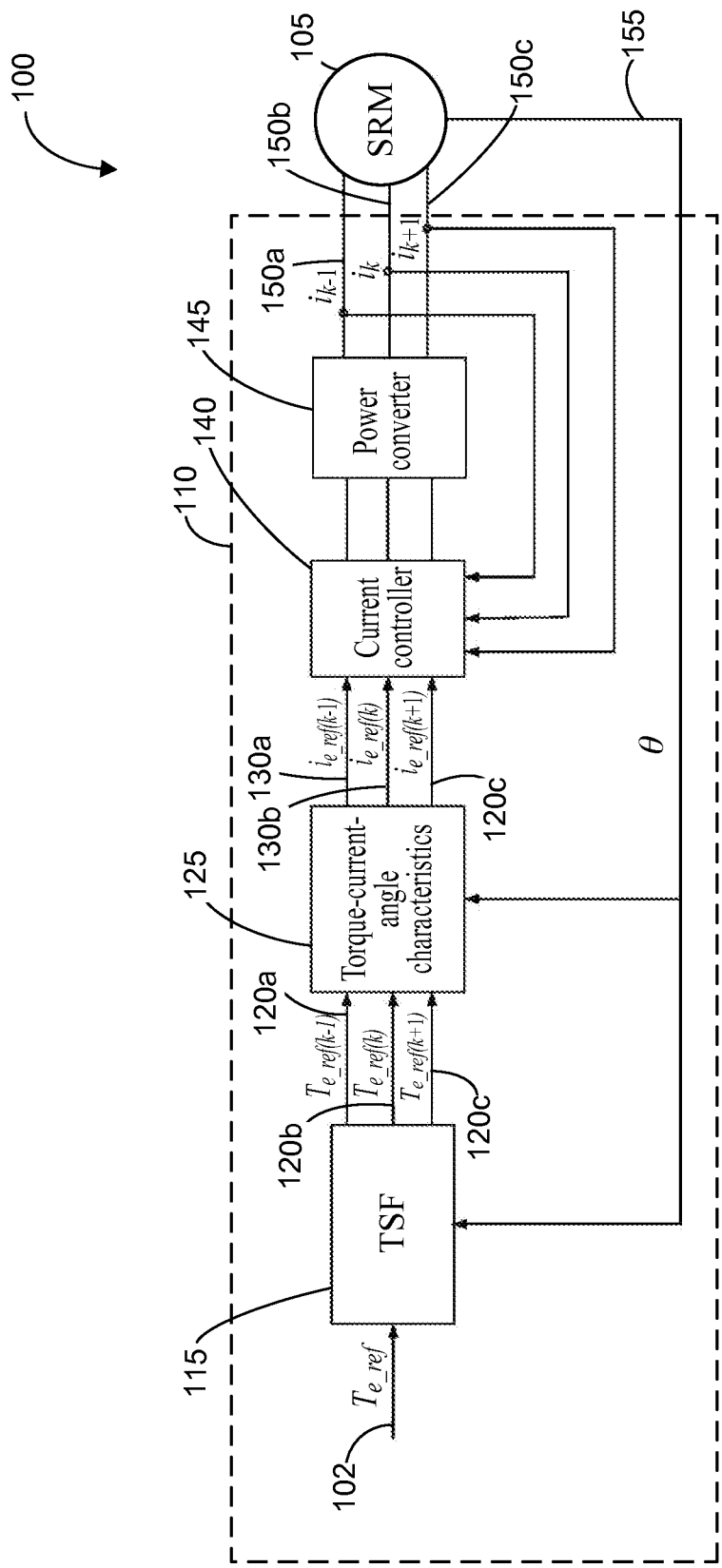
FIG. 1 illustrates an example embodiment of a switched reluctance motor system having a conventional torque control system.

The drawings are provided for the purposes of illustrating various aspects and features of the example embodiments described herein. For simplicity and clarity of illustration, elements shown in the Figures have not necessarily been drawn to scale. Further, where considered appropriate, reference numerals may be repeated among the Figures to indicate corresponding or analogous elements.

DETAILED DESCRIPTION

The various embodiments described herein relate to torque control of a switched reluctance motor (SRM) using a torque sharing function technique. In particular, the various embodiments described herein relate to an extended-speed low-ripple torque-control of a switched reluctance motor using a torque sharing function technique.

Reference is first made to FIG. 1, which illustrates a block diagram of a switched reluctance motor system 100 having a torque control system 110 according to an example embodiment. Torque control system 110 of FIG. 1 illustrates an instantaneous torque control of a switched reluctance motor 105 using a conventional torque sharing function (TSF) technique. As illustrated, the torque control system 110 of FIG. 1 is coupled to the switched reluctance motor 105 and controls the phase currents of the switched reluctance motor 105.

Most conventional TSF techniques, including linear TSF, cubic TSF, sinusoidal TSF, and exponential TSF, are offline TSFs which do not change the torque references for different phases according to the torque ripples. Furthermore, most conventional TSFs are defined at positive torque producing regions only, leading to high maximum absolute value of rate of change of flux linkage of the outgoing phase. Consequently, the torque speed performance is limited in conventional TSFs. In the illustrated embodiment, the TSF controller 115 of the torque control system 110 implements the conventional TSF techniques.

The TSF controller 115 receives a total torque reference 102 and intelligently divides it between each phase, where the torque introduced by each phase tracks its torque reference defined by the TSF controller 115. In the illustrated embodiment, a three-phase SRM is assumed. Accordingly, the TSF controller 115 divides the total torque reference 102 into torque references for each of the three phases, i.e. torque reference 120a for (k−1) phase, torque reference 120b for (k) phase, and torque reference 120c for (k+1) phase. Index (k−1) represents the outgoing phase, the index (k) represents the incoming phase and index (k+1) represents the next incoming phase.

The torque control system 110 of FIG. 1 further comprises a current reference generator 125 configured to generate current references for each of the three phases. As illustrated, current reference generator 125 is configured to generate current reference 130a for (k−1) phase, current reference 130b for (k) phase and current reference 130c for (k+1) phase based on the torque references 120a, 120b and 120c for the corresponding phases. Current reference generator 125 may use current profiling techniques to generate the current references 130a, 130b and 130c. As illustrated, both the TSF controller 115 and current reference generator 125 receive feedback 155 from the switched reluctance motor 105 to generate the torque references 120a, 120b and 120c and current references 130a, 130b and 130c, respectively.

The torque control system 110 of FIG. 1 further comprises a current controller 140 and a power converter 145 to receive current references 130a, 130b and 130c from the current reference generator 125 and control the phase currents of the switched reluctance motor 105. As illustrated, the current controller 140 and the power converter collaboratively control the current response 150a for (k−1) phase, current response 150b for (k) phase and current response 150c for (k+1) phase of the switched reluctance motor 105. In various embodiments, the current controller 140 comprises a hysteresis controller. In some other embodiments, other types of current controller 140 can be used.

In the illustrated embodiment, the current controller 140 compares the current references 130a, 130b and 130c and the current responses 150a, 150b and 150c and generates control signals for the power converter 145. The power converter 145 accordingly adjusts the phase currents of the three phases of the switched reluctance motor. Accordingly, both the current controller 140 and the power converter 145 function collaboratively to receive phase current feedback from the switched reluctance motor 105 to adjust and control the phase currents based on the current references received by the current controller 140.

Figure 2:
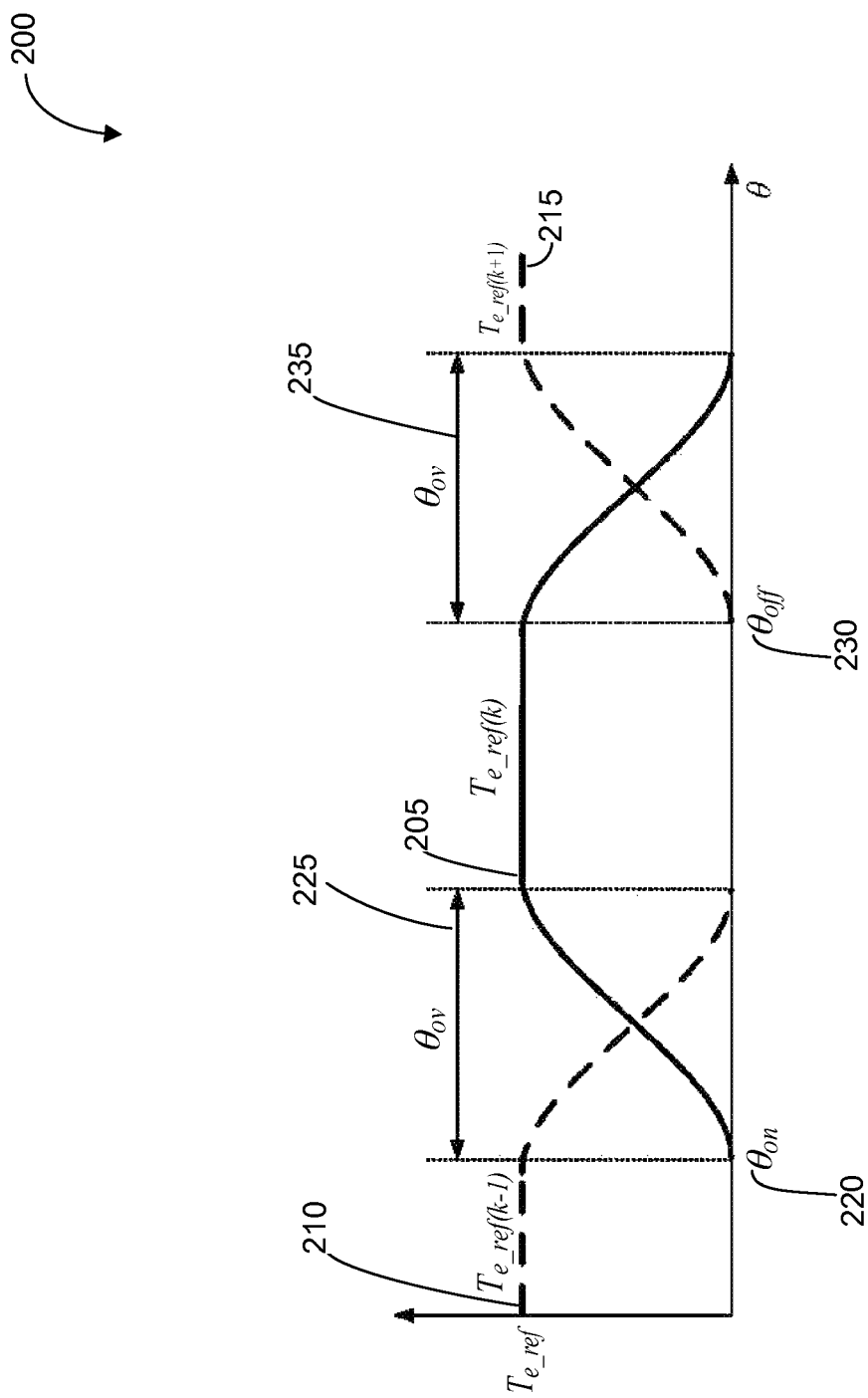
FIG. 2 illustrates a graphical representation of a torque sharing function according to an example embodiment.

Reference is next made to FIG. 2, which illustrates a graphical representation 200 of a torque sharing function according to an example embodiment. Torque sharing function of FIG. 2 illustrates that during commutation, the torque sharing function 205 of the incoming phase (k) is increasing from 0 to the torque reference for the (k) phase and the torque sharing function 210 of the outgoing phase (k−1) is decreasing from the torque reference for the (k−1) phase to 0. FIG. 2 further illustrates a turn-on angle, $\theta_{on}$, 220, where the torque sharing function 205 of the incoming phase (k) begins to increase from 0 to the torque reference for the (k) phase, and the torque sharing function 210 of the outgoing phase (k−1) begins to decrease from the torque reference for the (k−1) phase to 0. The region where the torque sharing function 205 is increasing and the torque sharing function 210 is decreasing is illustrated as the overlapping angle, $\theta_{ov}$, 225.

FIG. 2 also illustrates that at turn-off angle, $\theta_{off}$, 230, the torque sharing function 205 of the previous incoming phase (k) begins to decrease from the torque reference for the (k) phase to 0 and the torque sharing function 215 of a new incoming phase (k+1) increases from 0 to the torque reference for the (k+1) phase. The region where the torque sharing function 215 is increasing and the torque sharing function 205 is decreasing is illustrated as the overlapping angle, $\theta_{ov}$, 225.

Torque-speed performance and efficiency of different types of TSFs may be evaluated using various criteria, such as, for example, the rate of change of flux linkage with respect to rotor position, maximum absolute value of rate of change of flux linkage (ARCFL) with respect to rotor position, copper losses of electric machine, etc. For example, the torque-ripple-free speed range of a SRM is extended if the ARCFL is minimized. Similarly, the efficiency of SRM devices is improved if the copper losses are minimized.

Reference is next made to FIGS. 3A-3E, which illustrate graphical comparisons of different types of TSFs, namely linear TSF, cubic TSF and exponential TSF, for torque references, current references, flux linkages, rate of change of flux linkages and ARCFL or absolute value of rate of change of flux linkages in terms of rotor positions. The comparisons are based on a three-phase, 12/8, 6000 rpm SRM with a DC-link voltage of 300V. For the purposes of the comparisons, the turn-on angle $\theta_{on}$, turn-off angle $\theta_{off}$ and overlapping angle $\theta_{ov}$ of linear TSF, cubic TSF, and exponential TSF are set to 5°, 20° and 2.5°, respectively, where the angles are expressed in mechanical degrees. Furthermore, the torque reference is set to be 1 Nm.

Figure 3A:
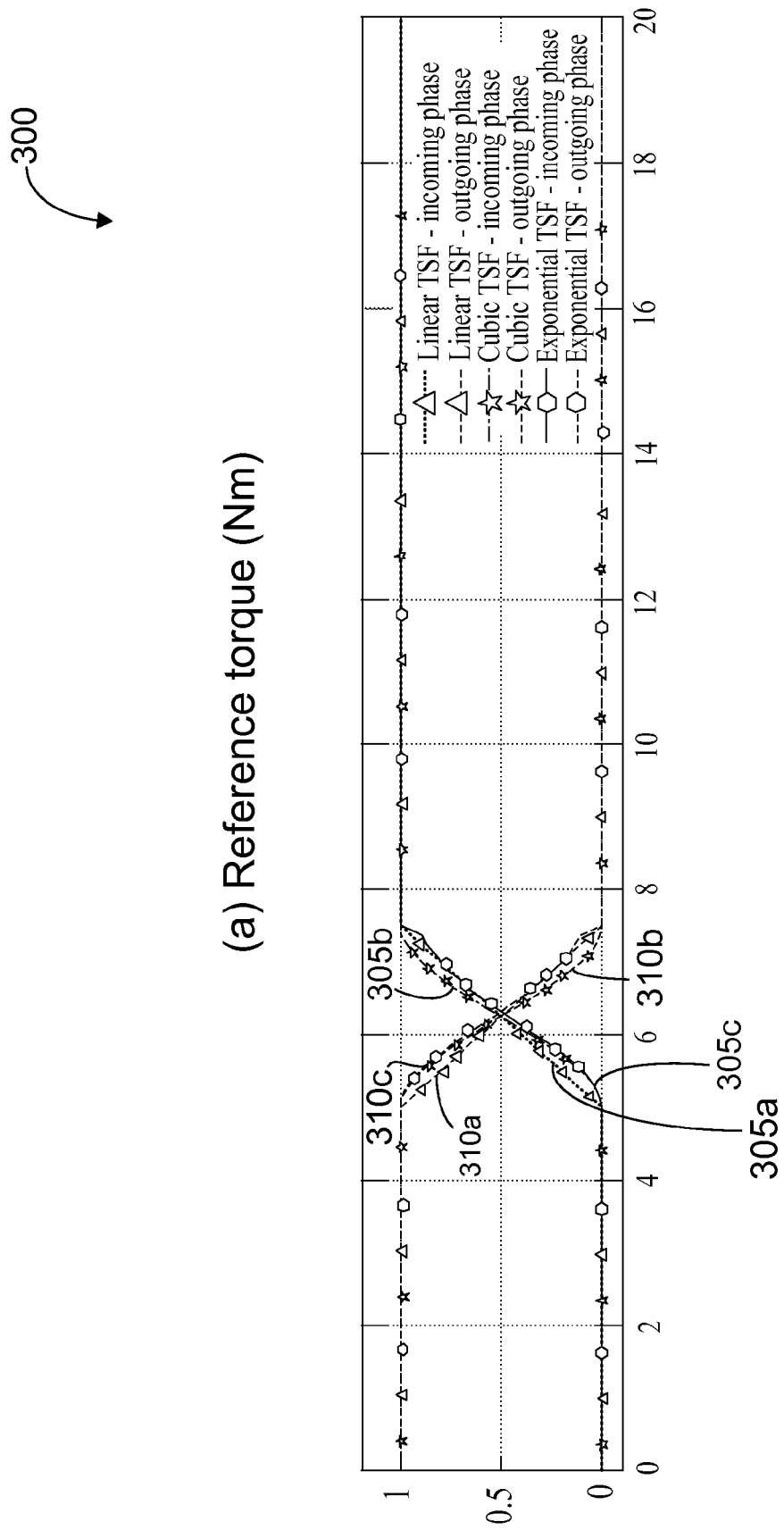
FIG. 3A illustrates a graphical representation of comparisons of torque references of conventional torque sharing functions according to an example embodiment.

FIG. 3A illustrates graphical comparisons regarding torque references of incoming and outgoing phases for linear TSF, cubic TSF and exponential TSF. FIG. 3A illustrates torque reference 305a of incoming phase of linear TSF, torque reference 305b of incoming phase of cubic TSF and torque reference 305c of incoming phase of exponential TSF. FIG. 3A also illustrates torque reference 310a of outgoing phase of linear TSF, torque reference 310b of outgoing phase of cubic TSF and torque reference 310c of outgoing phase of exponential TSF.

Figure 3B:
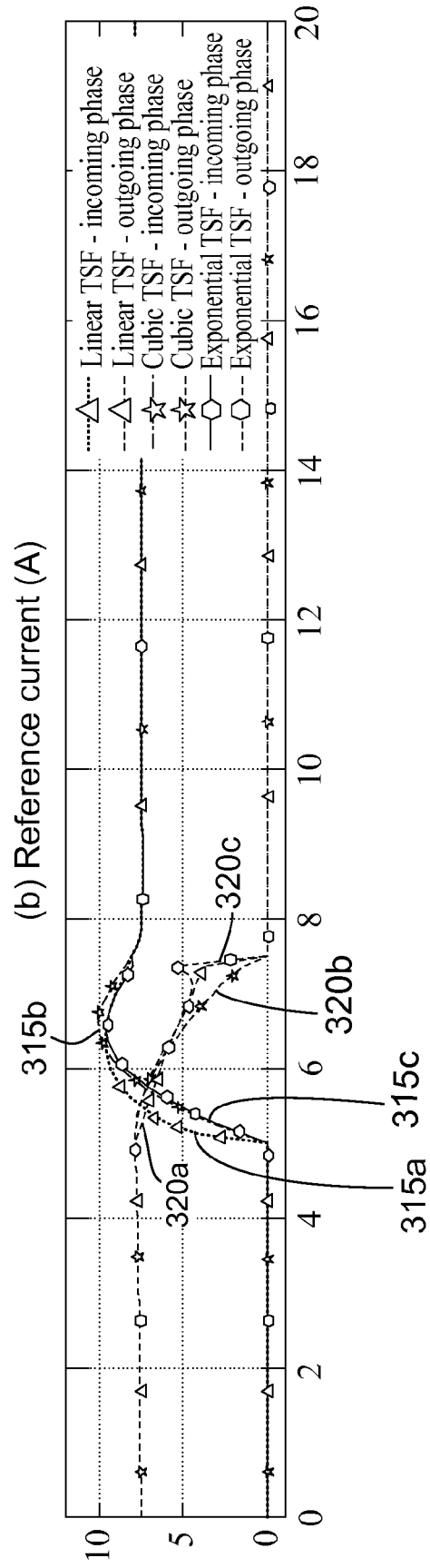
FIG. 3B illustrates a graphical representation of comparisons of current references of conventional torque sharing functions according to an example embodiment.

FIG. 3B illustrates graphical comparisons regarding current references of incoming and outgoing phases for linear TSF, cubic TSF and exponential TSF. FIG. 3B illustrates current reference 315a of incoming phase of linear TSF, current reference 315b of incoming phase of cubic TSF and current reference 315c of incoming phase of exponential TSF. FIG. 3B also illustrates current reference 320a of outgoing phase of linear TSF, current reference 320b of outgoing phase of cubic TSF and current reference 320c of outgoing phase of exponential TSF.

Figure 3C:
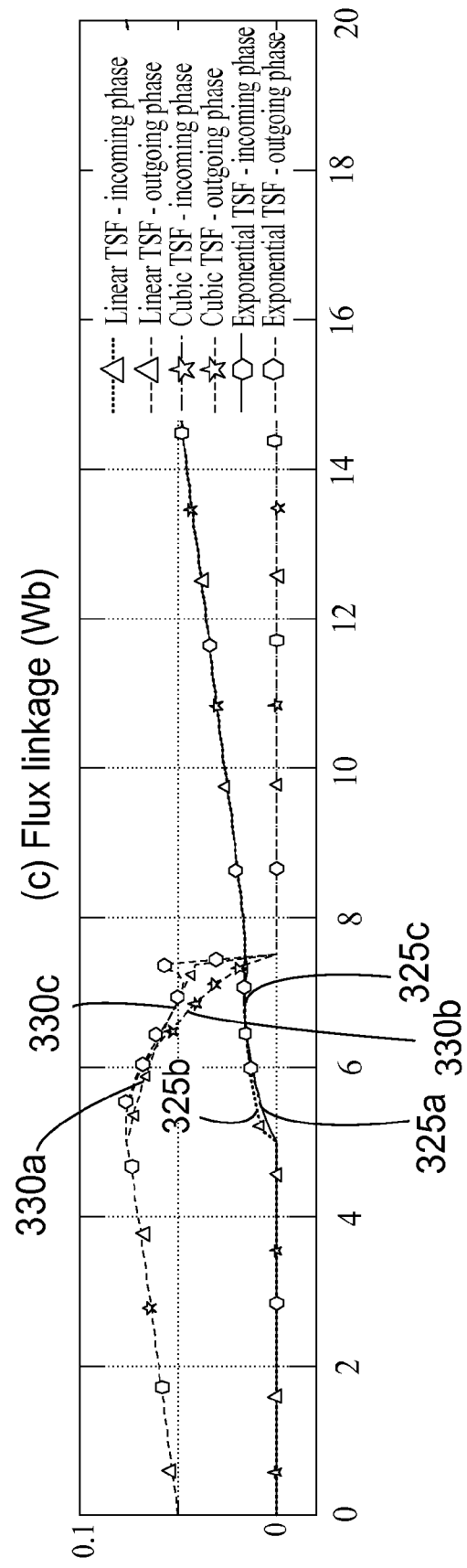
FIG. 3C illustrates a graphical representation of comparisons of flux linkages of conventional torque sharing functions according to an example embodiment.

FIG. 3C illustrates graphical comparisons regarding flux linkages of incoming and outgoing phases for linear TSF, cubic TSF and exponential TSF. FIG. 3C illustrates flux linkage 325a of incoming phase of linear TSF, flux linkage 325b of incoming phase of cubic TSF and flux linkage 325c of incoming phase of exponential TSF. FIG. 3C also illustrates flux linkage 330a of outgoing phase of linear TSF, flux linkage 330b of outgoing phase of cubic TSF and flux linkage 330c of outgoing phase of exponential TSF.

Figure 3D:
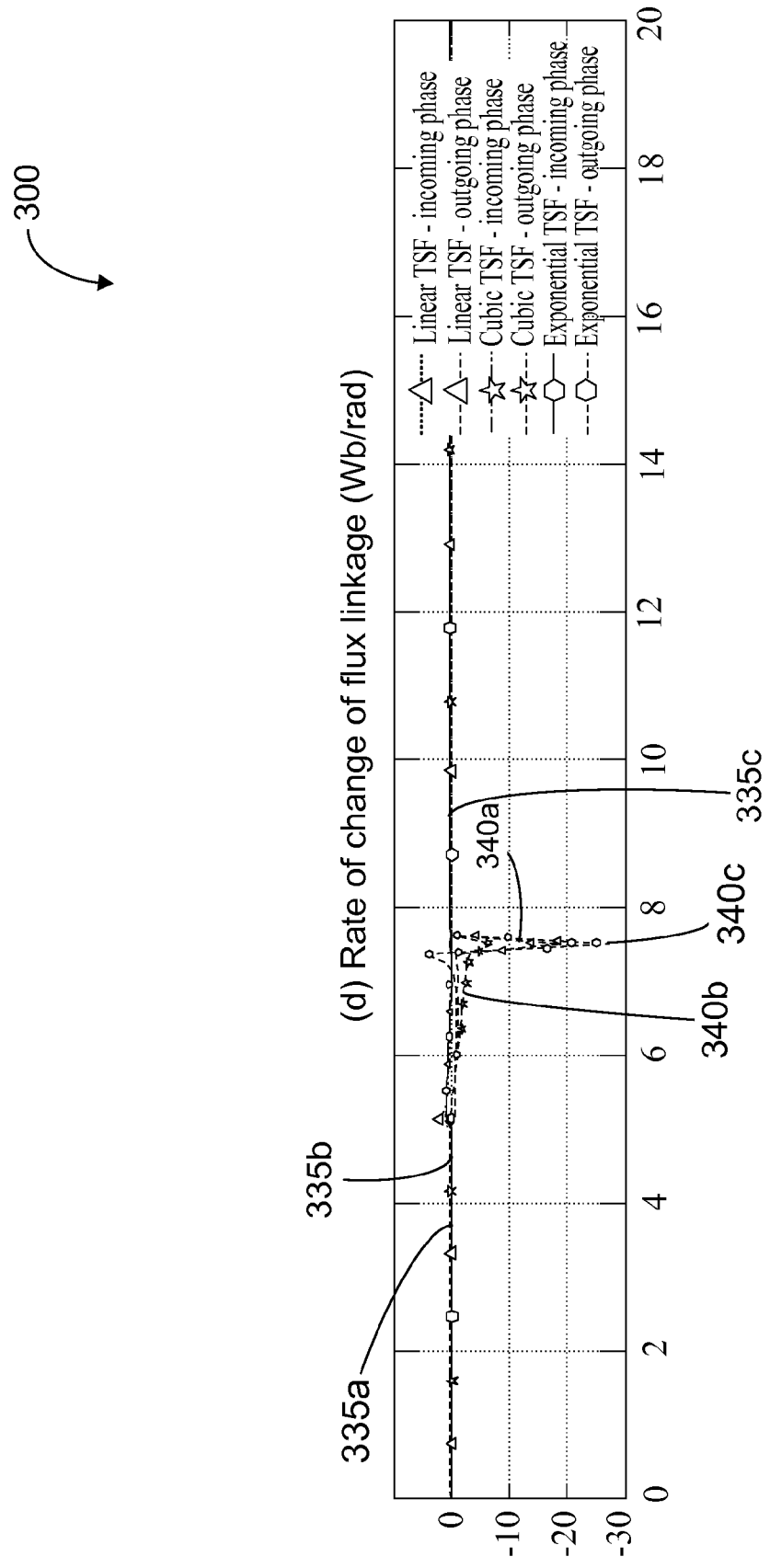
FIG. 3D illustrates a graphical representation of comparisons of rate of change of flux linkages of conventional torque sharing functions according to an example embodiment.

FIG. 3D illustrates graphical comparisons regarding rate of change of flux linkages of incoming and outgoing phases for linear TSF, cubic TSF and exponential TSF. FIG. 3D illustrates the rate of change of flux linkage 335a of incoming phase of linear TSF, the rate of change of flux linkage 335b of incoming phase of cubic TSF and the rate of change of flux linkage 335c of incoming phase of exponential TSF. FIG. 3D also illustrates the rate of change of flux linkage 340a of outgoing phase of linear TSF, the rate of change of flux linkage 340b of outgoing phase of cubic TSF and the rate of change of flux linkage 340c of outgoing phase of exponential TSF.

Figure 3E:
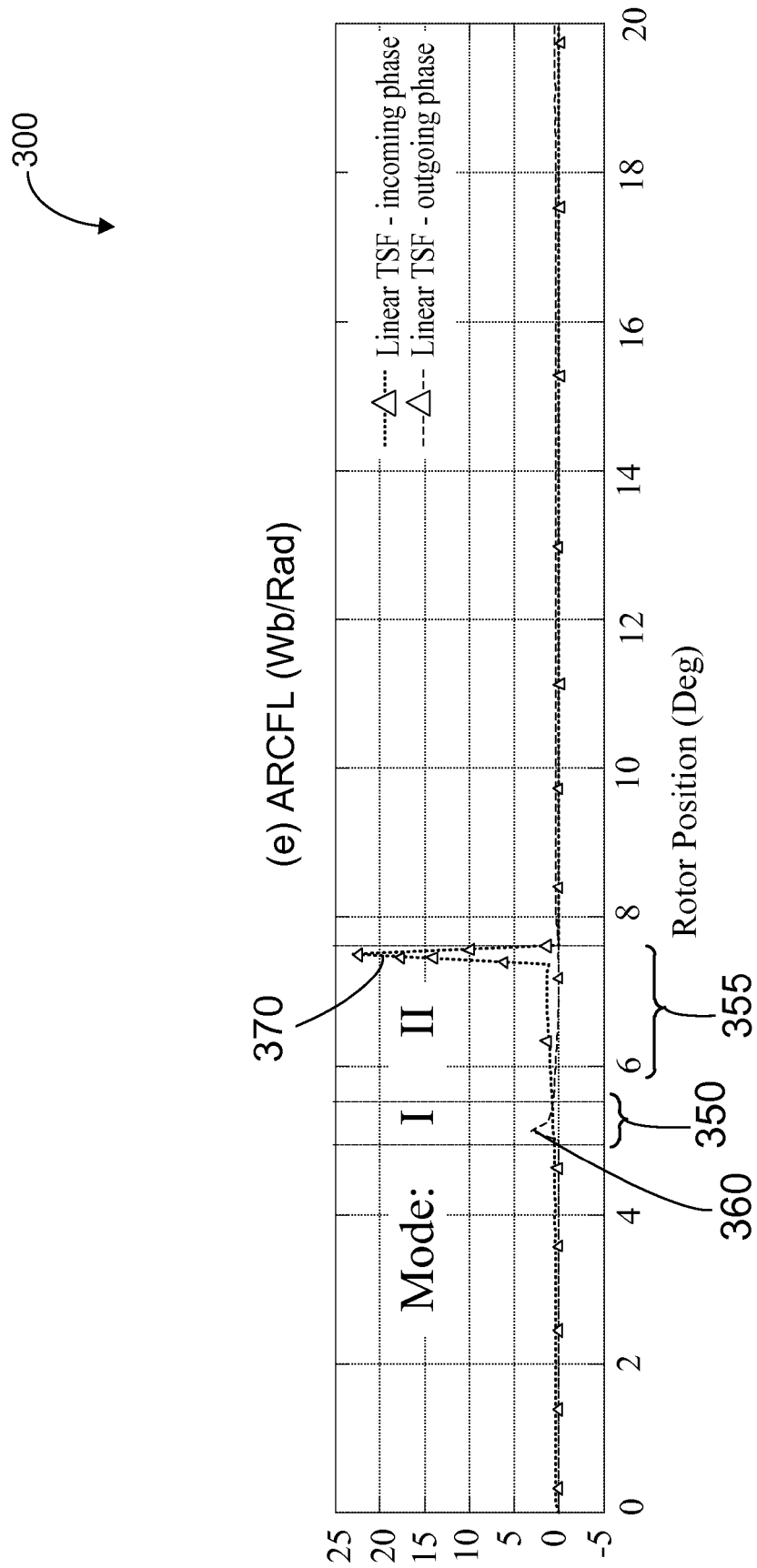
FIG. 3E illustrates a graphical representation of absolute value of rate of change of flux linkage for linear torque sharing function according to an example embodiment.

FIG. 3E illustrates a graphical representation of ARCFL of incoming and outgoing phases for linear TSF. FIG. 3E illustrates the ARCFL 360 of incoming phase of linear TSF and the ARCFL 370 of outgoing phase of linear TSF. As illustrated in FIG. 3E, two operational modes of the SRM in terms of the ARCFL are observed. In Mode I, illustrated as region 350, the ARCFL 360 of the incoming phase is a little higher than the ARCFL 370 of the outgoing phase and in Mode II, illustrated as region 355, the ARCFL of the outgoing phase 370 becomes much higher than the ARCFL of the incoming phase 360.

At each rotor position, the maximum ARCFL is determined by the phase which has higher ARCFL. Therefore, at the start of commutation (Mode I), the maximum ARCFL is determined by the incoming phase and, then, it is determined by the outgoing phase as the commutation ends (Mode II). Since maximum ARCFL at the end of commutation is much larger than that the one at the start of commutation in conventional TSFs, the maximum torque-ripple-free speed (TRFS) is defined by the outgoing phase.

Figure 4A:
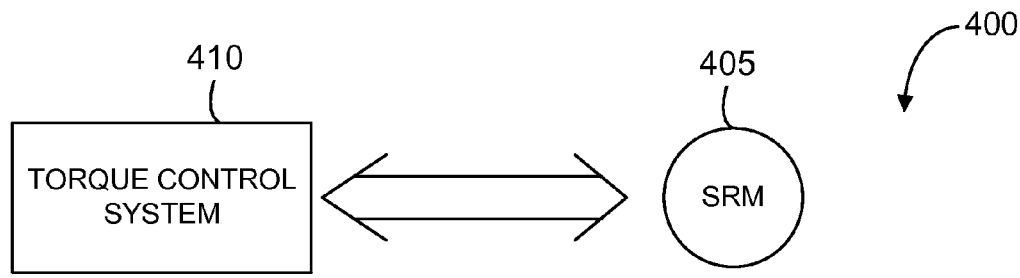
FIG. 4A illustrates a switched reluctance motor system having an online torque control system according to an example embodiment.
Figure 4B:
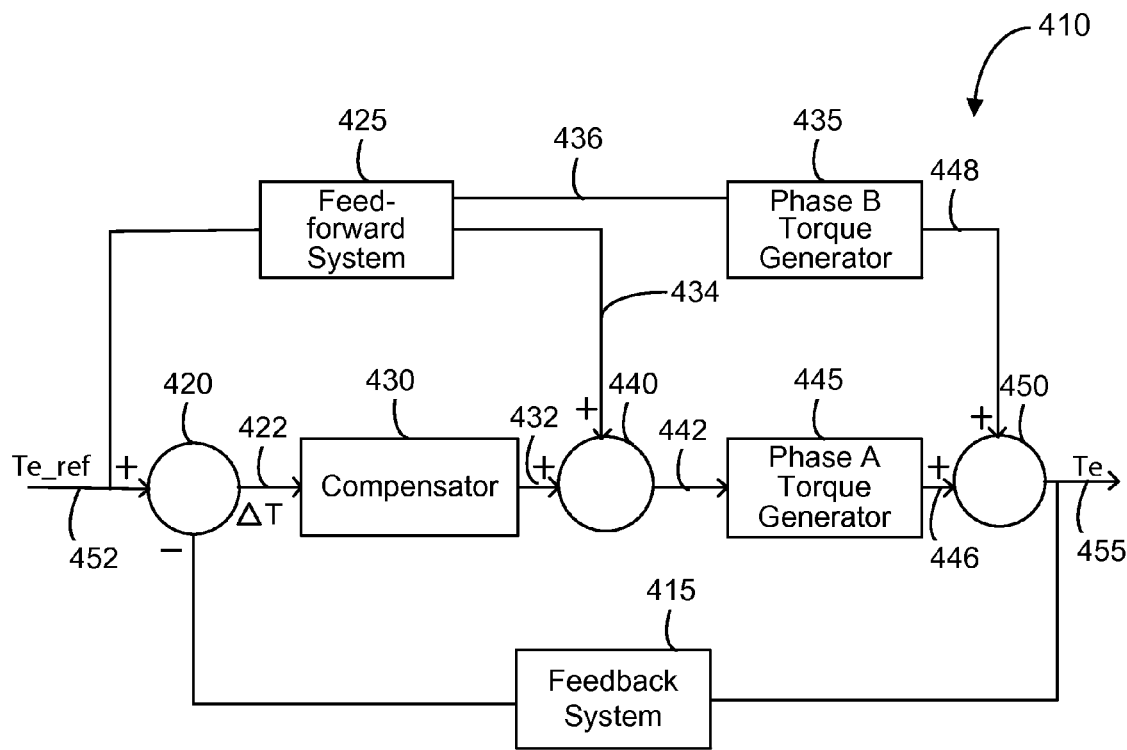
FIG. 4B illustrates the torque control system of FIG. 4A according to an example embodiment.

Reference is next made to FIGS. 4A-4B, which illustrate a block diagram of a switched reluctance motor system 400 having a torque control system 410 according to an example embodiment. As illustrated, the torque control system 410 of FIG. 4A is coupled to the switched reluctance motor 405 and controls the torque response of the switched reluctance motor 405.

Torque control system 410 of FIG. 4B illustrates a torque control of a switched reluctance motor 405 using an online torque sharing function ('online TSF') technique. In the online TSF technique, described in various embodiments herein, the torque error due to imperfect tracking of one phase is added to the torque reference of the other phase to compensate for the torque error. In the embodiments of FIGS. 4A and 4B, only two phases, i.e. (k−1) phase and (k) phase are conducting during commutation, where (k−1) phase and (k) phase represent for the outgoing phase and the incoming phase, respectively.

Torque control system 410 of FIG. 4B comprises a feedback system 415, a feed-forward system 425, a compensator 430, a phase B torque generator 425 and a phase A torque generator 445. The torque control system 410 receives a torque reference $T_{e\_ref}$ 452 and generates a torque response $T_e$ 455 for the SRM 405 taking into consideration the imperfect tracking of the torque reference by one or the other phase.

In the various embodiments illustrated herein, the online TSF technique consists of two modes. In mode I of the online TSF technique, the ARCFL of the outgoing phase is lower than the incoming phase at the start of commutation and thus tracking ability of the outgoing phase is better than the incoming phase. As illustrated in FIG. 3E, in Mode I, torque ripple at the start of commutation is mostly introduced by the torque tracking error of the incoming phase. In mode II of the online TSF technique, the ARCFL of the incoming phase is lower than the ARCFL of the outgoing phase and thus the tracking ability of the incoming phase is better than the outgoing phase. As illustrated in FIG. 3E, in Mode I, torque ripple at the end of commutation is mostly introduced by the torque tracking error of the outgoing phase.

The feedback system 415 provides the torque response $T_e$ 455 of the SRM 405 to summer 420. Summer 420 receives the torque response $T_e$ 455 from the feedback system 415 and torque reference 452 to generate torque error $\Delta T$ 422. The torque error $\Delta T$ 422, towards the beginning of the commutation (mode I), is introduced by the poor tracking ability of the incoming phase. Towards the end of the commutation (mode II), the torque error $\Delta T$ 422 is introduced by the poor tracking ability of the outgoing phase.

Compensator 430 receives the torque error $\Delta T$ 422 and generates a compensation signal 432 based on the stage of commutation, and accordingly the mode of operation. For example, towards the beginning of commutation or in mode I, the compensation signal 432 is generated to compensate for the poor tracking ability of the incoming phase. Towards the end of commutation or in mode II, the compensation signal 432 is generated to compensate for the poor tracking ability of the outgoing phase.

Feed-forward system 425 receives the torque reference 452 and generates the TSFs 434 and 436 of the incoming and the outgoing phases. During the beginning of commutation or mode I, the feed-forward system 425 generates the torque sharing function 434 for the outgoing phase and torque sharing function 436 for the incoming phase. During the end of commutation or mode II, the feed-forward system 425 generates the torque sharing function 434 for the incoming phase and torque sharing function 436 for the outgoing phase.

Summer 440 receives the compensation signal 432 from the compensator 430 and a TSF 434 from the feed-forward system 425 to generate a new phase torque reference 442. The new phase torque reference 442 corresponds to a new torque reference for the phase that has a better tracking ability at that time. In mode I, the TSF 434 corresponds to torque sharing function of the outgoing phase and the compensation signal 432 corresponds to the torque compensation required to overcome or minimize the poor tracking ability of the incoming phase. Consequently, in mode I, the new phase torque reference corresponds to a new torque reference for the outgoing phase.

Similarly, in mode II, the TSF 434 corresponds to torque sharing function of the incoming phase and the compensation signal 432 corresponds to the torque compensation required to overcome or minimize the poor tracking ability of the outgoing phase. Consequently, in mode II, the new phase torque reference corresponds to a new torque reference for the incoming phase.

Phase A torque generator 445 and phase B torque generator 435 receive new phase torque reference 442 and torque sharing function 436, respectively, to generate torque responses 446 and 448 for corresponding phases, i.e. phase A and phase B respectively.

In mode I, the phase A torque generator 445 receives the new phase torque reference 442 for the outgoing phase and generates the torque response 446 for the outgoing phase. The phase B torque generator 435 receives the torque sharing function 436 of the incoming phase and generates the torque response 448 for the incoming phase.

Similarly, in mode II, the phase A torque generator 445 receives the new phase torque reference 442 for the incoming phase and generates the torque response 446 for the incoming phase. The phase B torque generator 435 receives the torque sharing function 436 of the outgoing phase and generates the torque response 448 for the outgoing phase.

Figure 5A:
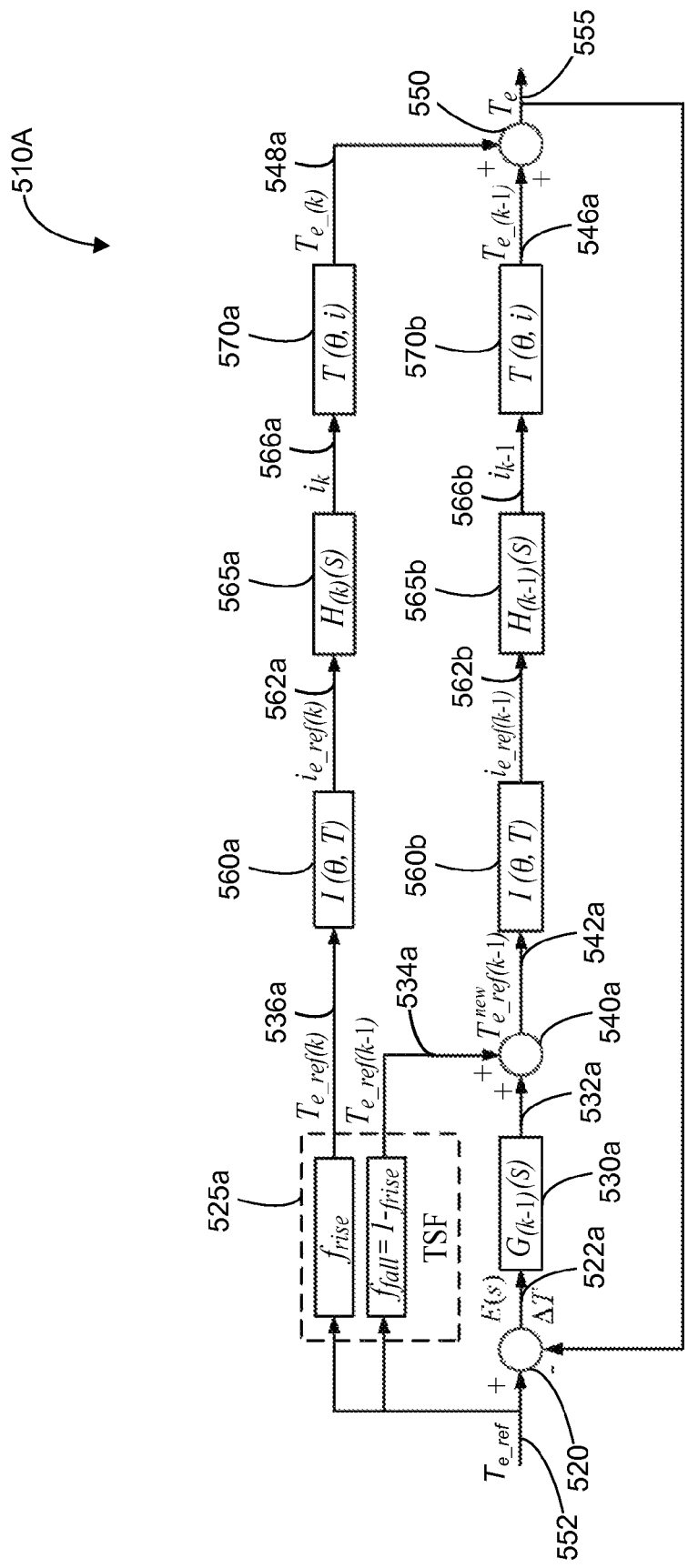
FIG. 5A illustrates a torque control system according to an example embodiment.
Figure 5B:
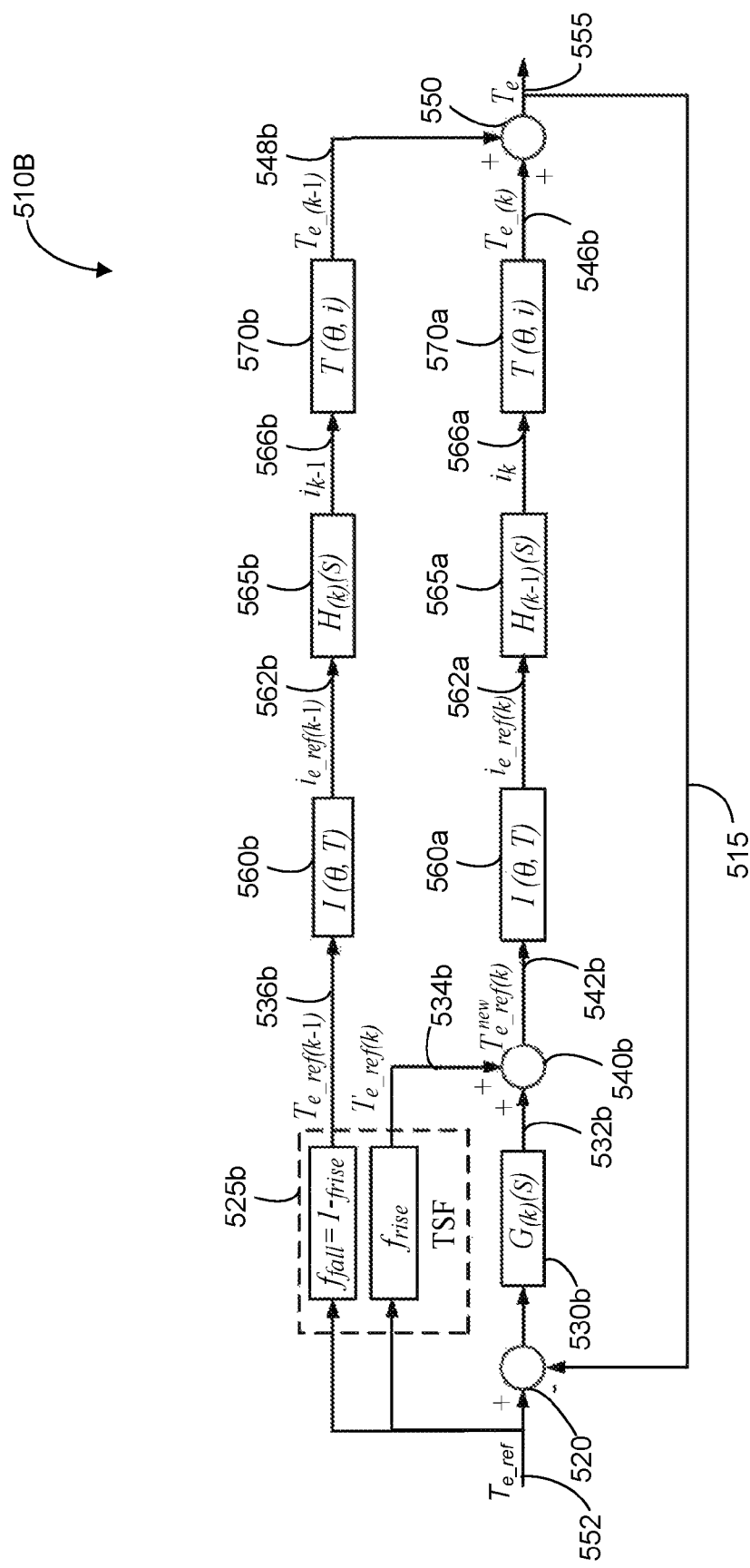
FIG. 5B illustrates a torque control system according to another example embodiment.

Reference is next made to FIGS. 5A and 5B, which illustrate torque control systems 510A and 510B according to different example embodiments. Torque control system 510A of FIG. 5A corresponds to the torque control system in Mode I of operation, i.e. towards the beginning of commutation. Torque control system 510B of FIG. 5B corresponds to the torque control system in Mode II of operation, i.e. towards the end of commutation.

Torque control system 510A comprises a feedback system 515, a feed-forward system 525a, a compensator 530a, current converters 560a and 560b, an incoming current response generator 565a, an outgoing current response generator 565b, and torque generators 570a and 570b. The torque control system 510A receives a torque reference $T_{e\_ref}$ 552 and generates a torque response $T_e$ 555 for a corresponding SRM taking into consideration the imperfect tracking of the torque reference by the incoming phase.

As previously mentioned, the feedback system 515 provides the torque response $T_e$ 555 of the SRM to summer 520. Summer 520 receives the torque response $T_e$ 555 from the feedback system 515 and torque reference 552 to generate torque error $\Delta T$ 522a, which is introduced by the poor tracking ability of the incoming phase. Compensator 530a receives the torque error $\Delta T$ 522a and generates a compensation signal 532a to compensate for the poor tracking ability of the incoming phase. Feed-forward system 525a receives the torque reference 552 and generates the TSF 534a for the outgoing phase and TSF 536a for the incoming phase. Summer 540a receives the compensation signal 532a from the compensator 530a and TSF 534a for the outgoing phase to generate a new outgoing phase torque reference 542a.

Current converter 560a converts the TSF 536a of the incoming phase into current reference 562a of the incoming phase. Similarly, current converter 560b converts the new outgoing phase torque reference 542a of the outgoing phase into current reference 562b of the outgoing phase. Incoming current response generator 565a receives the current reference 562a and generates a current response 566a for the incoming phase. Torque generator 570a receives the current response 566a and generates the torque response 548a for the incoming phase. Similarly, outgoing current response generator 565b receives the current reference 562b and generates a current response 566b for the outgoing phase. Torque generator 570b receives the current response 566b and generates the torque response 546a for the outgoing phase. Summer 550 receives the torque response 546a of the outgoing phase and torque response 548a of the incoming phase to generate a torque response 555 of the corresponding SRM.

As illustrated, the feed-forward system 525a comprises the TSF 536a and 534a of incoming and outgoing phases respectively. The TSFs of incoming phase and outgoing phases are represented as (1) and (2), respectively.

$$f_{rise}(\theta) = \frac{T_{e\_ref(k)}}{T_{e\_ref}} \quad (1)$$

$$f_{fall}(\theta) = \frac{T_{e\_ref(k-1)}}{T_{e\_ref}} \quad (2)$$

where the index (k−1) represents the outgoing phase and the index (k) represents the incoming phase. Since ARCFL of the outgoing phase is lower in Mode I, for an ideal case, it can be assumed that the torque of the outgoing phase is equal to its reference:

$$T_{e\_ref(k-1)} T_{e\_(k-1)} \quad (3)$$

Torque tracking error $\Delta T$ 522a of the incoming phase can be obtained as (4), which could be positive or negative.

$$T_{e\_ref(k)} = T_{e\_(k)} + \Delta T \quad (4)$$

Adding (3) and (4) together, (5) can be derived. The total torque error is denoted by $\Delta T$ 522a, which is introduced by the incoming phase.

$$\begin{aligned} T_{e\_ref} &= T_{e\_ref(k-1)} + T_{e\_ref(k)} \\ &= T_{e\_(k-1)} + T_{e\_(k)} + \Delta T => T_{e\_ref} \\ &= T_e + \Delta T \end{aligned} \quad (5)$$

The torque error introduced by incoming phase can be possibly compensated by the outgoing phase, which has better tracking performance. Therefore, torque reference of the outgoing phase is modified to generate a new outgoing phase torque reference 542a, represented as (6) below.

$$T_{e\_ref(k-1)}^{new} = T_{e\_ref(k-1)} + \Delta T \quad (6)$$

The torque response of the outgoing phase of online TSF can be obtained assuming the tracking error of the outgoing phase is zero.

$$T_{e(k-1)}^{new} = T_{e\_ref(k-1)}^{new} = T_{e\_ref(k-1)} + \Delta T \quad (7)$$

The torque response of the incoming phase is kept the same as (4) since the torque reference of the incoming phase is unchanged. Then, the torque response of incoming phase can be represented as (8).

$$T_{e\_(k)}^{new} = T_{e\_(k)} = T_{e\_ref(k)} \Delta T \quad (8)$$

The online TSF in terms of the torque error could be defined as (9) and (10). Online TSF illustrated in the various embodiments described herein is based on the torque response of each phase not their torque reference. The sum of the new online TSF is equal to one.

$$f_{rise}^{new}(\theta) = \frac{T_{e\_(k)}^{new}}{T_{e\_ref}} = \frac{T_{e\_ref(k)} - \Delta T}{T_{e\_ref}} = f_{rise}(\theta) - \frac{\Delta T}{T_{e\_ref}} \quad (9)$$

-continued $$f_{fall}^{new}(\theta) = \frac{T_{e\_(k-1)}^{new}}{T_{e\_ref}} = \frac{T_{e\_ref(k-1)} + \Delta T}{T_{e\_ref}} = f_{fall}(\theta) + \frac{\Delta T}{T_{e\_ref}} \quad (10)$$

By adding (7) and (8) together, the sum of the torque response of incoming phase and outgoing phase is equal to the torque reference 555 as shown in (11).

$$T_e^{new} = T_{e\_(k)}^{new} + T_{e\_(k-1)}^{new} \quad (11)$$
$$= (T_{e\_ref(k)} - \Delta T) + (T_{e\_ref(k-1)} + \Delta T)$$
$$= T_{e\_ref}$$

The torque ripple is eliminated if the tracking error of outgoing phase is zero. Therefore, in Mode I, the torque error is determined by tracking precision of the outgoing phase, which has lower ARCFL and, hence, better torque tracking ability than the incoming phase.

Current converters, I (θ, T), 560a and 560b, represent torque to current conversion based on torque-current-rotor position characteristics. Torque generators, T (θ, i), 570a and 570b, illustrate the torque generation mechanism of the SRM. In various cases, if precise torque-current-angle characteristics of SRM are known, relationship between I (θ, T) and T (θ, i) can be derived as (12).

$$I(\theta, T) = \frac{1}{T(\theta, i)} \quad (12)$$

Incoming current response generator 565a represents a transfer function $H_{(k)}(s)$ representing current response for incoming phase. Outgoing current response generator 565b represents a transfer function $H_{(k-1)}(s)$, which represents current response for the outgoing phase. Time delay of the current control loop is dependent on the rotor position and speed; therefore an analytical expression may be hard to obtain. The maximum time delay of the current control loop is considered to simplify the controller design. $H_{(k-1)}(s)$ and $H_{(k)}(s)$ are denoted as (13) and (14). Maximum time delay is assumed to be 0.001 both for the incoming and outgoing phases.

$$H_{(k-1)}(s) = \frac{1}{\tau_1 s + 1} \quad (13)$$

$$H_{(k)}(s) = \frac{1}{\tau_2 s + 1} \quad (14)$$

where τ1 and τ2 are time delay of outgoing phase and incoming phase.

Thus, the currents of each phase 566a and 566b are obtained as (15) and (16).

$$i_{(k-1)} = \frac{1}{\tau_1 s + 1} i_{ref\_(k-1)} \quad (15)$$

$$i_{(k)} = \frac{1}{\tau_2 s + 1} i_{ref\_(k)} \quad (16)$$

As illustrated, the torque control system 510A is a closed loop control system having a feed-forward system 525a, feedback system 515 and compensator 530a. The open loop transfer function of online TSF can be obtained as (17).

$$TSF(s) = G_{(k-1)}(s) H_{(k-1)}(s) \quad (17)$$

The torque error transfer function E(s) is defined as (18) and the torque response 555 is represented as (19).

$$E(s) = T_{e\_ref} - T_e \quad (18)$$

$$T_e = (1 - f_{rise}) T_{e\_ref} H_{(k-1)}(s) + f_{rise} T_{e\_ref} H_{(k)}(s) + E(s) G_{(k-1)}(s) H_{(k-1)}(s) \quad (19)$$

Combining (17), (18) and (19), the transfer function from reference to error of online TSF can be derived as (20).

$$\frac{E(s)}{T_{e\_ref}} = \frac{1 - (1 - f_{rise}) H_{(k-1)}(s) - f_{rise} H_{(k)}(s)}{1 + TSF(s)} \quad (20)$$

In case of conventional TSF, since there is no torque error compensation, hence $G_{(k-1)}(s)$ equals zero and open loop transfer function TSF(s) equals zero. Therefore, the transfer function from reference to error of conventional TSFs is illustrated as (21).

$$\frac{E(s)}{T_{e\_ref}} = \frac{T_{e\_ref} - T_e}{T_{e\_ref}} = 1 - (1 - f_{rise}) H_{(k-1)}(s) - f_{rise} H_{(k)}(s) \quad (21)$$

By applying online TSF, the torque error is added to the torque reference of outgoing phase to compensate the torque error mainly introduced by the incoming phase in Mode I. Torque reference of the outgoing phase can be defined as (6). As illustrated in FIG. 5A, the new torque reference of the outgoing phase 542a is defined as (22) by adding compensator $G_{(k-1)}(s)$.

$$T_{e\_ref(k-1)}^{new} = T_{e\_ref(k-1)} + \Delta T G_{(k-1)}(s) \quad (22)$$

$G_{(k-1)}(s)$ is set to one by comparing (6) and (22). Thus, the open loop transfer function TSF(s) of online TSF is equal to $H_{(k-1)}(s)$. Since $H_{(k-1)}(s)$ is close to one at low frequencies and open loop transfer function TSF(s) is close to one in this case. Therefore, the transfer function from reference to error of online TSF is illustrated as (23). Compared with (21) in conventional TSFs, torque error of online TSF is reduced by 50%. It is assumed that the tracking error of the outgoing phase is zero and thus torque ripples can be eliminated by using online TSF. This is valid for an ideal case. However, at higher speed, the tracking error of outgoing phase increases, leading to higher torque ripples. The performance of online TSF in torque ripple reduction is still limited. To further reduce the torque error, the gain of the open loop function TSF(s) needs to be increased at low frequencies.

$$\frac{E(s)}{T_{e\_ref}} = \frac{1 - (1 - f_{rise}) H_{(k-1)}(s) - f_{rise} H_{(k)}(s)}{2} \quad (23)$$

In various embodiments, the compensator 530a is a proportional and integral (PI) compensator $G_{(k-1)}(s)$. In such embodiments, the parameters of the compensator 530a are adjusted to boost the gain of the open loop transfer function at low frequencies. Based on this requirement, the compensator $G_{(k-1)}(s)$ is selected as (24).

Figure 6A:
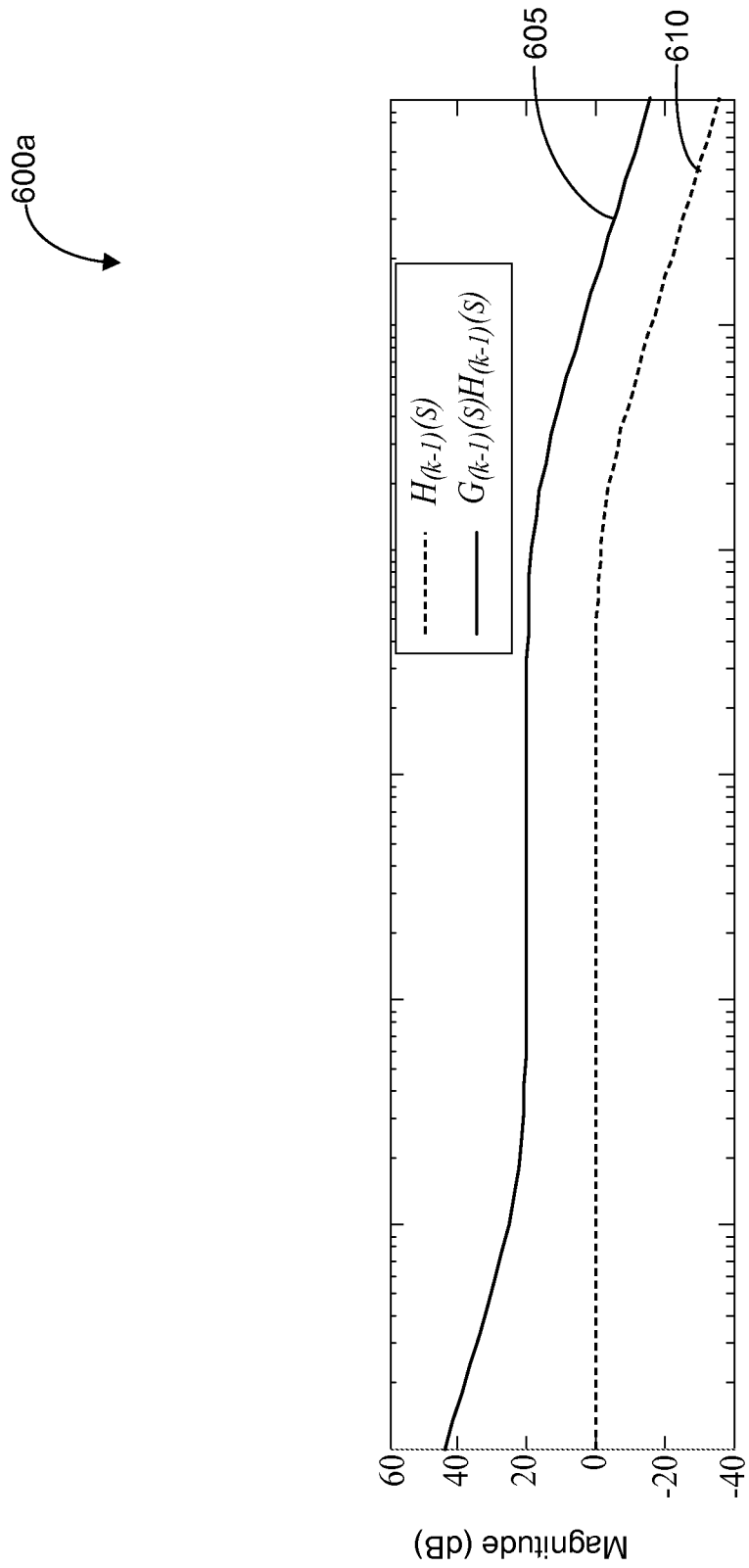
FIG. 6A illustrates the magnitude portion of an open loop bode plot according to an example embodiment.
Figure 6B:
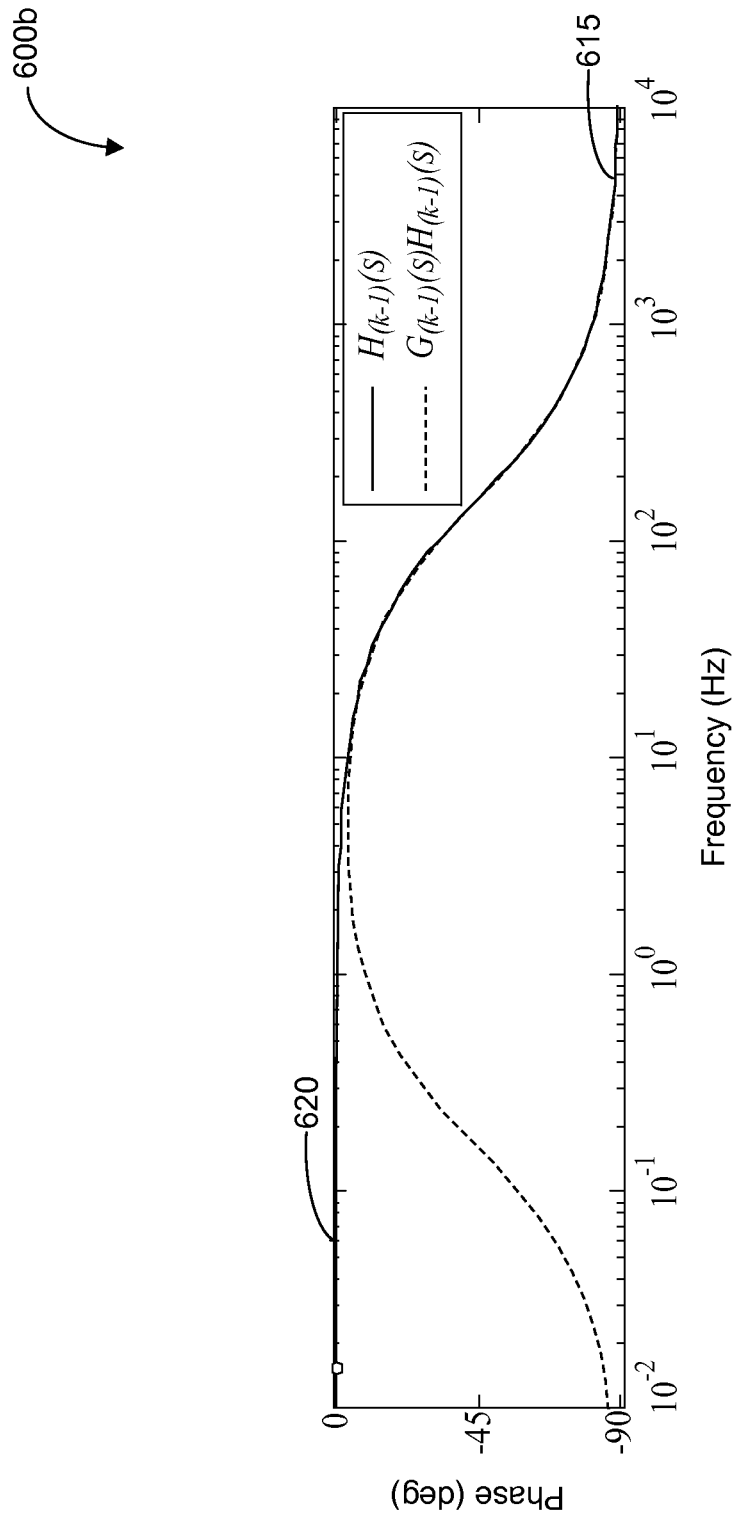
FIG. 6B illustrates the phase portion of an open loop bode plot according to another example embodiment.

Reference is made to FIGS. 6A and 6B, which illustrate the bode plot of outgoing current response generator 565a, defined as function H$_{(k-1)}$(s), and G$_{(k-1)}$(s) H$_{(k-1)}$(s). FIG. 6A illustrates a graphical representation of the magnitude portion of the bode plots of function H$_{(k-1)}$(s) 610, and G$_{(k-1)}$(s) H$_{(k-1)}$(s) 605. FIG. 6B illustrates the phase portion of the bode plots of function H$_{(k-1)}$(s) 620, and G$_{(k-1)}$(s) H$_{(k-1)}$(s) 615. Compared with open loop transfer function H$_{(k-1)}$(s), the amplitude of open loop transfer function is greatly enhanced after compensator G$_{(k-1)}$(s), as illustrated in plot 605, and thus the torque tracking error can be further reduced.

$$G_{(k-1)}(s) = 10 + \frac{10}{s} \quad (24)$$

Reference is next made to torque control system 510B of FIG. 5B, which corresponds to the torque control system in Mode II of operation, i.e. towards the end of commutation. Torque control system 510B comprises a feedback system 515, a feed-forward system 525b, a compensator 530b, current converters 560a and 560b, an incoming current response generator 565a, an outgoing current response generator 565b, and torque generators 570a and 570b. The torque control system 510B receives a torque reference T$_{e\_ref}$ 552 and generates a torque response T$_e$ 555 for a corresponding SRM taking into consideration the imperfect tracking of the torque reference by the outgoing phase.

As previously mentioned, the feedback system 515 provides the torque response T$_e$ 555 of the SRM to summer 520. Summer 520 receives the torque response T$_e$ 555 from the feedback system 515 and torque reference 552 to generate torque error ΔT 522b, which is introduced by the poor tracking ability of the outgoing phase. Compensator 530b receives the torque error ΔT 522b and generates a compensation signal 532b to compensate for the poor tracking ability of the outgoing phase. Feed-forward system 525b receives the torque reference 552 and generates the TSF 534b for the incoming phase and TSF 536b for the outgoing phase. Summer 540b receives the compensation signal 532b from the compensator 530b and TSF 534b for the incoming phase to generate a new incoming phase torque reference 542b.

Outgoing current converter 560b converts the TSF 536b of the outgoing phase into current reference 562b of the outgoing phase. Similarly, incoming current converter 560a converts the new incoming phase torque reference 542b of the incoming phase into current reference 562a of the incoming phase. Incoming current response generator 565a receives the current reference 562a and generates a current response 566a for the incoming phase. Torque generator 570a receives the current response 566a and generates the torque response 546b for the incoming phase. Similarly, outgoing current response generator 565b receives the current reference 562b and generates a current response 566b for the outgoing phase. Torque generator 570b receives the current response 566b and generates the torque response 548b for the outgoing phase. Summer 550 receives the torque response 546b of the incoming phase and torque response 548b of the outgoing phase to generate a torque response 555 of the corresponding SRM.

Since, in Mode II, the ARCFL of incoming phase is lower than that of outgoing phase and thus tracking ability of incoming phase is better than outgoing phase. Torque ripple is mostly introduced by the torque tracking error of the outgoing phase in this mode. Assuming the torque of the incoming phase is equal to its reference.

$$T_{e\_ref(k)} = T_{e\_(k)} \quad (25)$$

Torque tracking error ΔT 522b of the outgoing phase can be obtained as (26).

$$T_{e\_ref(k-1)} = T_{e\_(k-1)} + \Delta T \quad (26)$$

Adding (25) and (26), (27) can be derived. The total torque error is denoted by ΔT 522b, which is introduced by outgoing phase.

$$T_{e\_ref} = T_e + \Delta T \quad (27)$$

The torque error introduced by outgoing phase could be possibly compensated by the incoming phase, which has better tracking performance. Similarly, torque reference of the incoming phase is modified to generate a new incoming torque reference 542b, as (28).

$$T_{e\_ref(k)}^{new} = T_{e\_ref(k)} + \Delta T \quad (28)$$

The new online TSF in terms of the torque error in Mode II is defined as (29) and (30). The sum of the new online TSF is equal to one.

$$f_{rise}^{new}(\theta) = \frac{T_{e\_(k)}}{T_{e\_ref}} = f_{rise}(\theta) + \frac{\Delta T}{T_{e\_ref}} \quad (29)$$

$$f_{fall}^{new}(\theta) = \frac{T_{e\_(k-1)}}{T_{e\_ref}} = f_{fall}(\theta) - \frac{\Delta T}{T_{e\_ref}} \quad (30)$$

Thus, the torque error of online TSF is decided by tracking ability of the incoming phase in Mode II. The compensator 530b of incoming phase G$_m$(s) is selected as the same as outgoing phase.

Figure 7A:
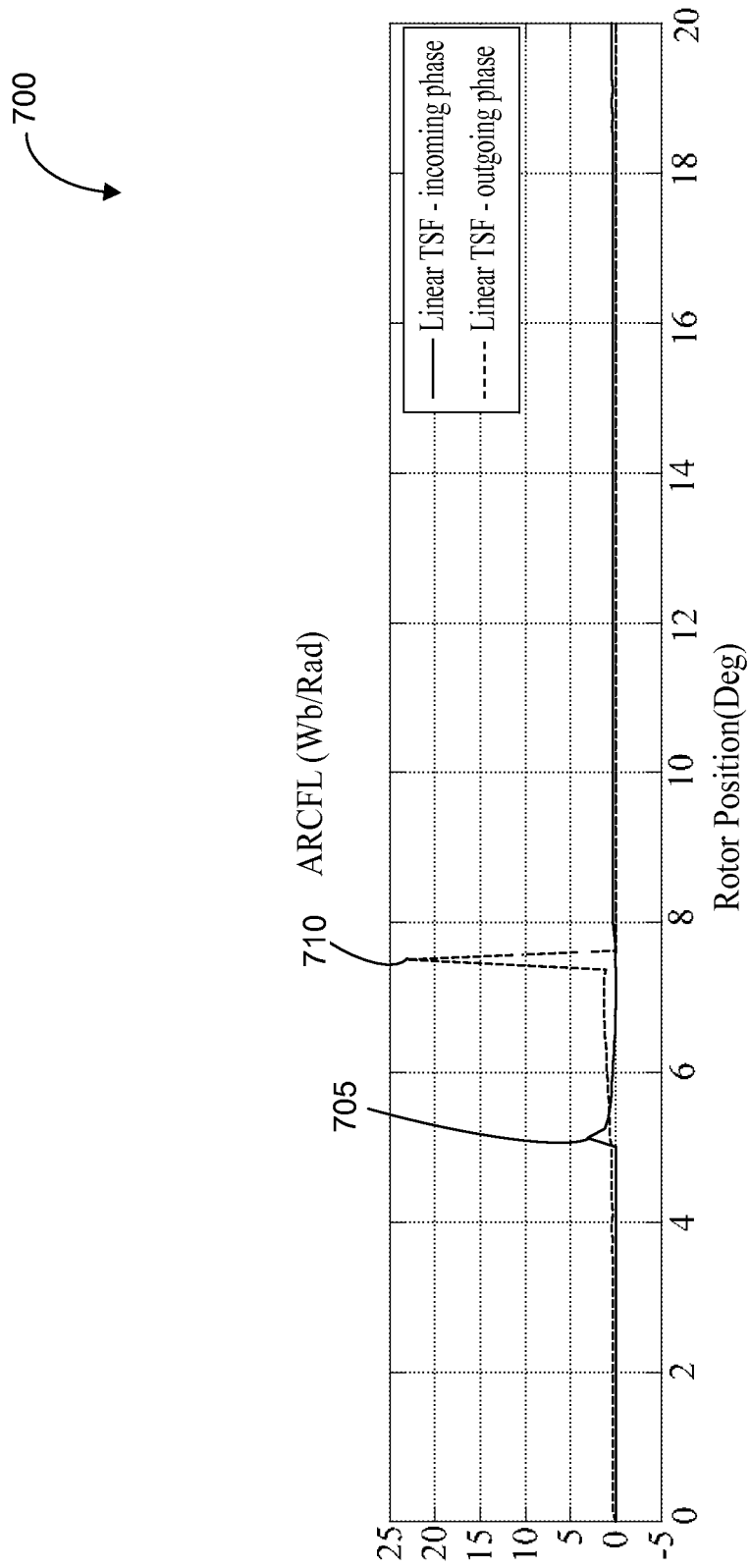
FIG. 7A illustrates a graphical representation of maximum absolute value of rate of change of flux linkage of a linear TSF according to an example embodiment.
Figure 7B:
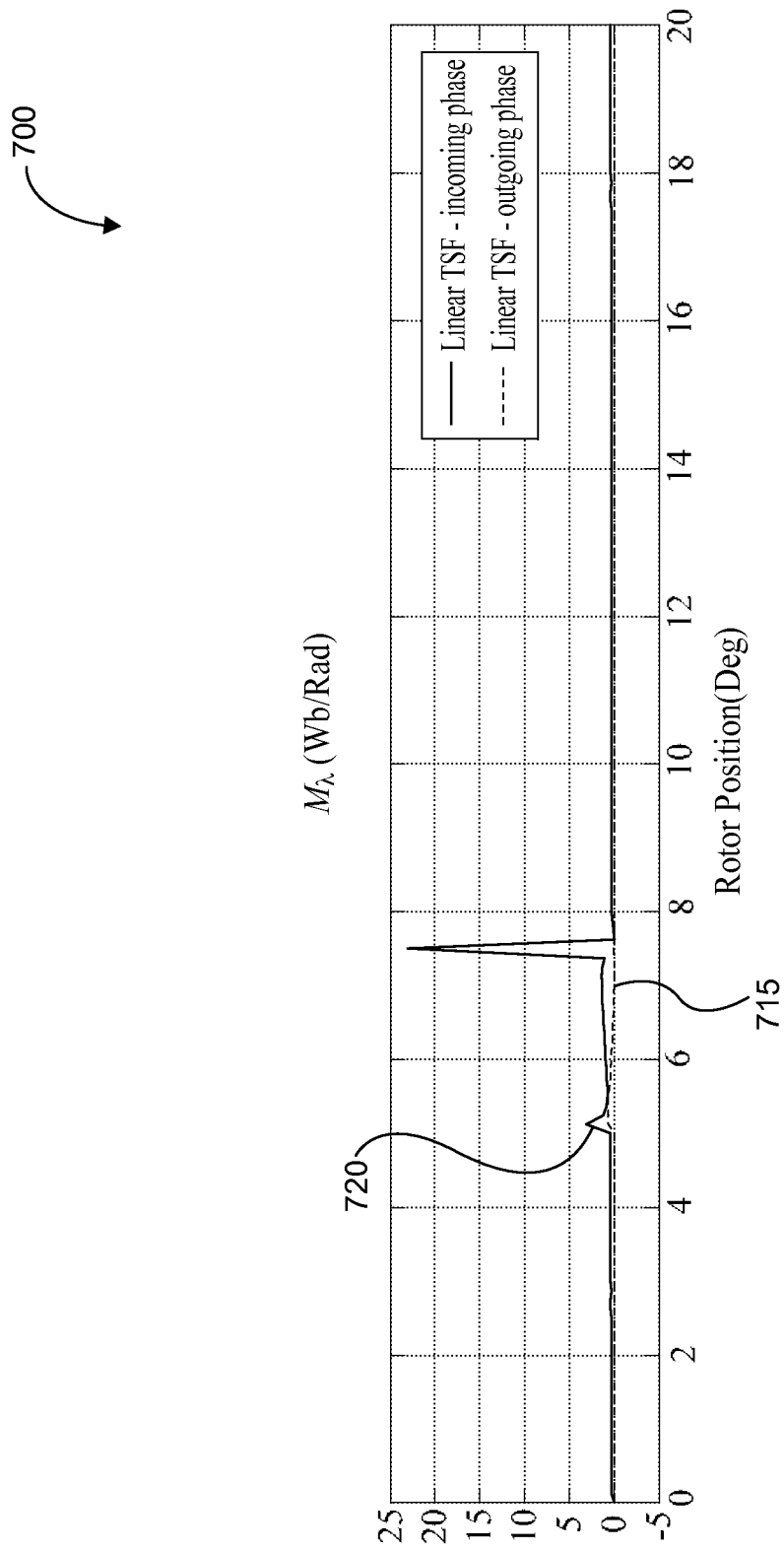
FIG. 7B illustrates a graphical representation of comparisons between a linear TSF and an online TSF according to an example embodiment.
Figure 8:
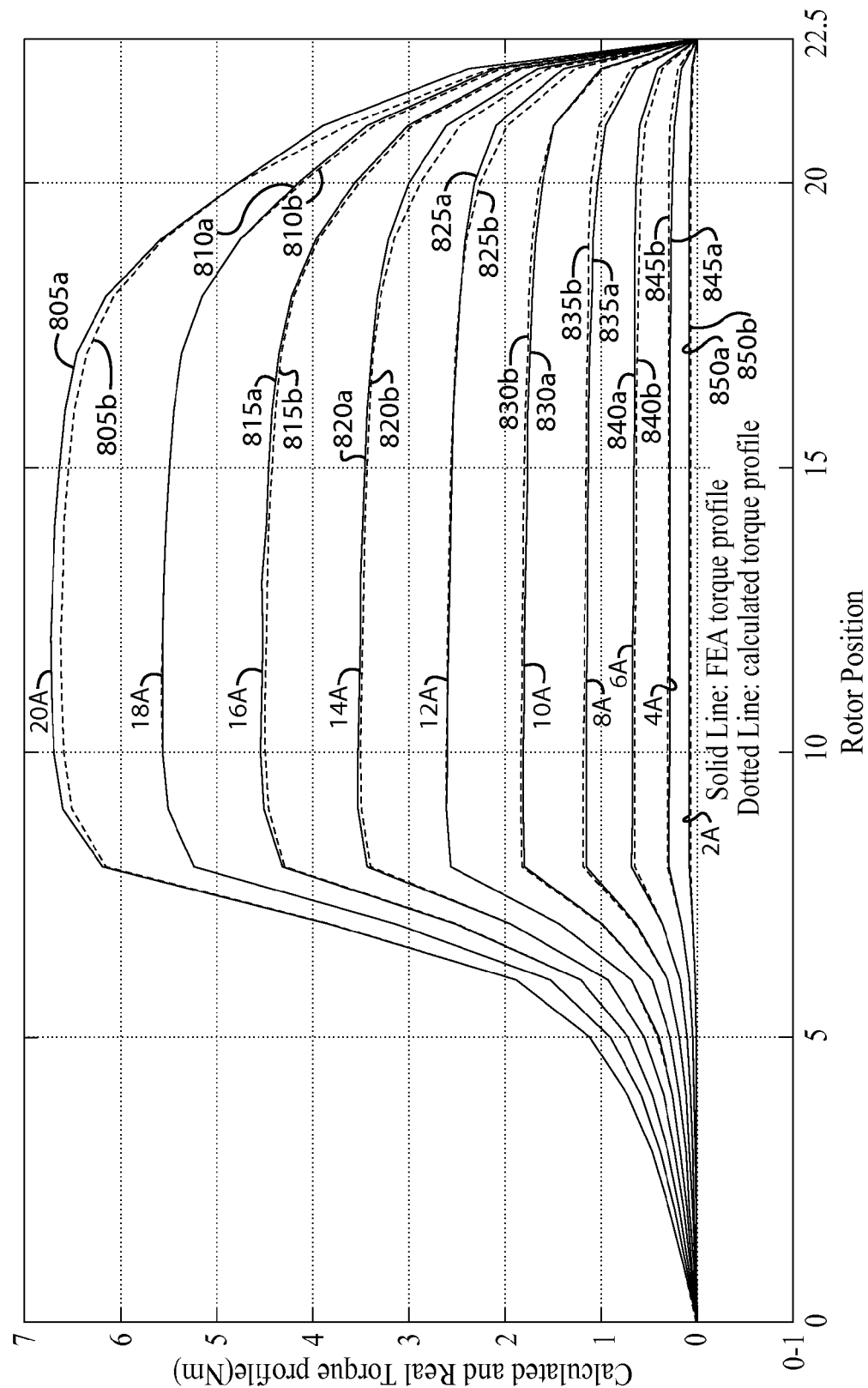
FIG. 8 illustrates a graphical representation of comparisons of calculated and FEA torque profiles of online TSF for various current settings according to an example embodiment.

Reference is next made to FIGS. 7A, 7B and 8, which generally illustrate different performance and efficiency measures of different TSFs. To evaluate the torque-speed performance and efficiency of different TSFs, the following two criteria may be used: 1) The maximum ARCFL with respect to rotor position and 2) Copper loss of electric machine.

With respect to the first criteria of the maximum ARCFL with respect to rotor positions, it is noted that the torque ripple is dependent on the tracking performance of each phase and that the ARCFL should be minimized to reduce required DC-link voltage as well as to maximize region with the torque-ripple-free speed. The maximum ARCFL Mλ is defined as (31) to evaluate the torque-speed performance of a specific TSF.

$$M_\lambda = \max\left\{ \left|\frac{d\lambda_{rise}}{d\theta}\right|, \left|\frac{d\lambda_{fall}}{d\theta}\right| \right\} \quad (31)$$

where λ$_{rise}$ is i the flux linkage for the incoming phase, λ$_{fall}$ is i the flux linkage for the outgoing phase.

The maximum TRFS is derived as (32).

$$\omega_{max} = \frac{V_{dc}}{M_\lambda} \quad (32)$$

where ω$_{max}$ is the maximum TRFS, V$_{dc}$ is the DC-link voltage.

With respect to the copper loss criteria, it is noted that copper loss is an important factor influencing efficiency of the electric machine. RMS value of phase current is derived as (33).

$$I_{rms} = \sqrt{\frac{1}{2(\theta_{off} - \theta_{on})} \left( \int_{\theta_{on}}^{\theta_{off}} i_k^2 d\theta + \int_{\theta_{on}}^{\theta_{off}} i_{k-1}^2 d\theta \right)} \quad (33)$$

The maximum ARCFL M A of conventional TSFs is defined as (31). The torque error of online TSF, as illustrated in FIGS. 4B, 5A and 5B, is decided by the phase with better tracking ability and therefore the maximum ARCFL Mλ of the online TSF is defined as (34).

$$M_\lambda = \min\left\{ \left| \frac{d\lambda_{rise}}{d\theta} \right|, \left| \frac{d\lambda_{fall}}{d\theta} \right| \right\} \quad (34)$$

FIGS. 7A and 7B illustrate graphical representations of comparisons between linear TSF and online TSF. FIG. 7A illustrates incoming ARCFL plot 705 and outgoing ARCFL plot 710 for linear TSF. FIG. 7B illustrates the maximum ARCFL M A plot 720 of linear TSF and maximum ARCFL M A plot 715 of online TSF as discussed with respect to various embodiments described herein, and particularly the embodiments of FIGS. 4B, 5A and 5B. As illustrated in FIG. 7B, the Mλ of online TSF at the end of commutation is much lower than that of linear TSF.

In one simulation, the Mλ of online TSF, linear TSF, cubic TSF, and exponential TSF were found to be 0.7 Wb/rad, 18.8 Wb/rad, 7.15 Wb/rad and 27.2 Wb/rad, respectively. Therefore, according to (32), the maximum TRFS of online TSF, linear TSF, cubic TSF, and exponential TSF are 4194 rpm, 152 rpm, 400 rpm, and 105 rpm, respectively. Accordingly, the maximum TRFS of online TSF is more than 10 times as high as that of the cubic TSF, which has best torque speed performance among the conventional TSFs.

In various embodiments, the online TSF of FIGS. 4B, 5A and 5B may be linear based online TSF, cubic based online TSF and exponential based online TSF. Based on various simulations, the maximum ARCFL of cubic based online TSF, exponential based online TSF and linear based online TSF are found to be very similar, and therefore the teachings herein are applicable to linear based online TSF, cubic based online TSF and exponential based online TSF.

Reference is next made to FIG. 8, which illustrates the torque profiles 800 of SRM systems, containing online TSF and considering magnetic saturation, as a function of rotor positions. In order to extend the online TSF to the saturated magnetic region, the torque profile is modeled by using equation (35).

$$T_{ek}(\theta, i) = \frac{a(\theta) i_k^2(\theta)}{(1 + b(\theta) i_k^3(\theta))^{\frac{1}{3}}} \quad (35)$$

where a (θ) and b (θ) are the parameters to be defined as a function of rotor position.

By using curve fitting, parameters a (θ) and b (θ) are obtained to represent the torque profiles. In FIG. 8, the torque profiles by using (35) and torque profiles by using real or finite element analysis (FEA) are denoted as the dotted line and solid line, respectively. Plots 805a and 805b illustrate the real and calculated torque profiles at current level of 2 A respectively, plots 810a and 810b illustrate the real and calculated torque profiles at current level of 4 A respectively, plots 815a and 815b illustrate the real and calculated torque profiles at current level of 6 A respectively, plots 820a and 820b illustrate the real and calculated torque profiles at current level of 8 A respectively, plots 825a and 825b illustrate the real and calculated torque profiles at current level of 10 A respectively, plots 830a and 830b illustrate the real and calculated torque profiles at current level of 12 A, plots 835a and 835b illustrate the real and calculated torque profiles at current level of 14 A respectively, plots 840a and 840b illustrate the real and calculated torque profiles at current level of 16 A respectively, plots 845a and 845b illustrate the real and calculated torque profiles at current level of 18 A respectively, and plots 850a and 850b illustrate the real and calculated torque profiles at current level of 20 A respectively. As illustrated in FIG. 8, the torque profiles obtained with (35) match with the FEA torque profiles in different rotor positions and at different current levels.

Figure 9:
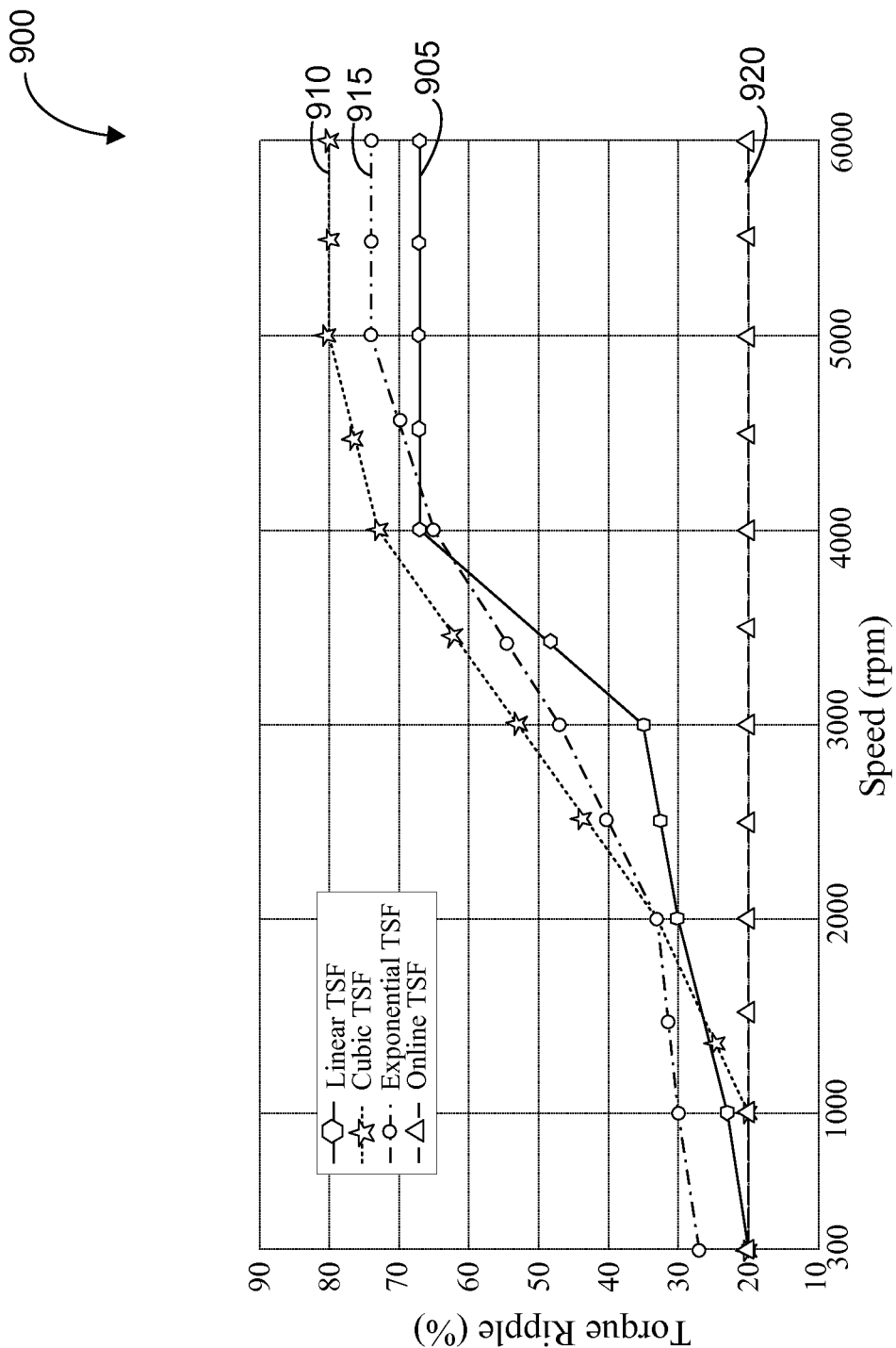
FIG. 9 illustrates a graphical representation of comparisons of torque ripples of different TSFs according to an example embodiment.

Reference is next made to FIG. 9, which illustrates a graphical representation 900 of comparisons between torque ripples of various types of TSFs, namely linear TSF, cubic TSF, exponential TSF and online TSF, as a function of speed. Graph 905 illustrates the relationship between torque ripple and speed of a SRM using linear TSF. Graph 910 illustrates the relationship between torque ripple and speed of a SRM using cubic TSF. Graph 915 illustrates the relationship between torque ripple and speed of a SRM using exponential TSF. Graph 920 illustrates the relationship between torque ripple and speed of a SRM using online TSF.

As illustrated in FIG. 9, the value of the torque ripples of linear 905, cubic 910, and exponential 915 TSFs at 6000 rpm are more than three times as high as non-commutation ripples. Below 1000 rpm, the cubic TSF 910 shows a lower value of torque ripples than exponential TSF 915 and linear TSF 905. However, cubic TSF 910 shows higher torque ripples at higher speed. At 6000 rpm, linear TSF 905 achieves about 15% torque reduction compared with cubic TSF 910.

However, as illustrated, the torque ripples of the online TSF 920 are kept constant over the wide speed range and are equal to the non-commutation ripples. Thus, the maximum torque ripple of online TSF 920 is only 25%, 27%, and 30% of that of linear 905, exponential 915 and cubic 910 TSFs.

Figure 10:
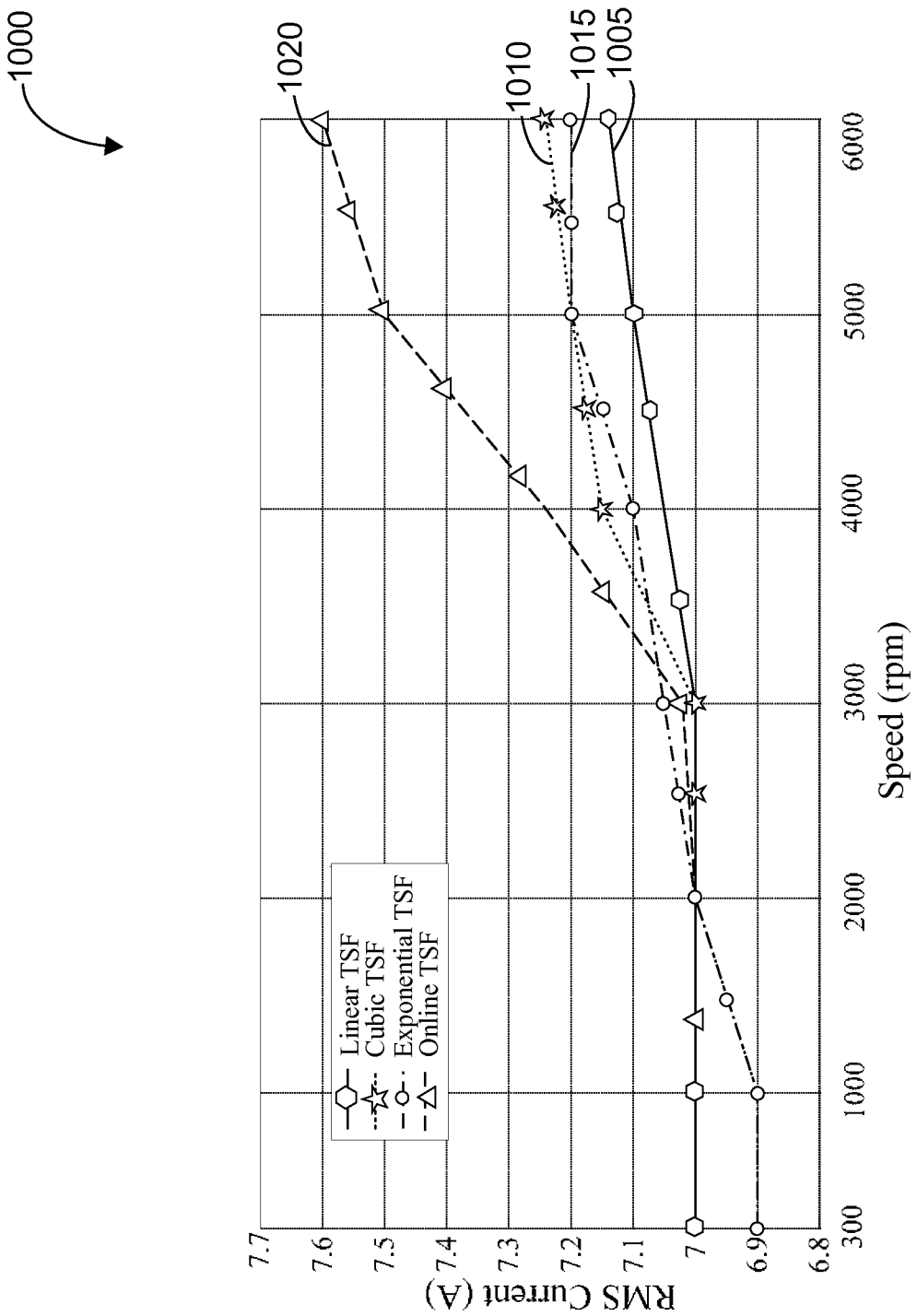
FIG. 10 illustrates a graphical representation of comparisons of RMS currents of different TSFs according to an example embodiment.

Reference is next made to FIG. 10, which illustrates a graphical representation 1000 of comparisons between RMS currents of various types of TSFs, namely linear TSF, cubic TSF, exponential TSF and online TSF, as a function of speed. Graph 1005 illustrates the relationship between RMS current and speed of a SRM using linear TSF. Graph 1010 illustrates the relationship between RMS current and speed of a SRM using cubic TSF. Graph 1015 illustrates the relationship between RMS current and speed of a SRM using exponential TSF. Graph 1020 illustrates the relationship between RMS current and speed of a SRM using online TSF.

As illustrated in FIG. 10, differences in RMS current for different TSFs are minor and can be neglected below 3000 rpm. At speeds higher than 3000 rpm, the RMS current of the online TSF 920 shows slight increase, mostly due to the higher torque produced by incoming phase.

Figure 11:
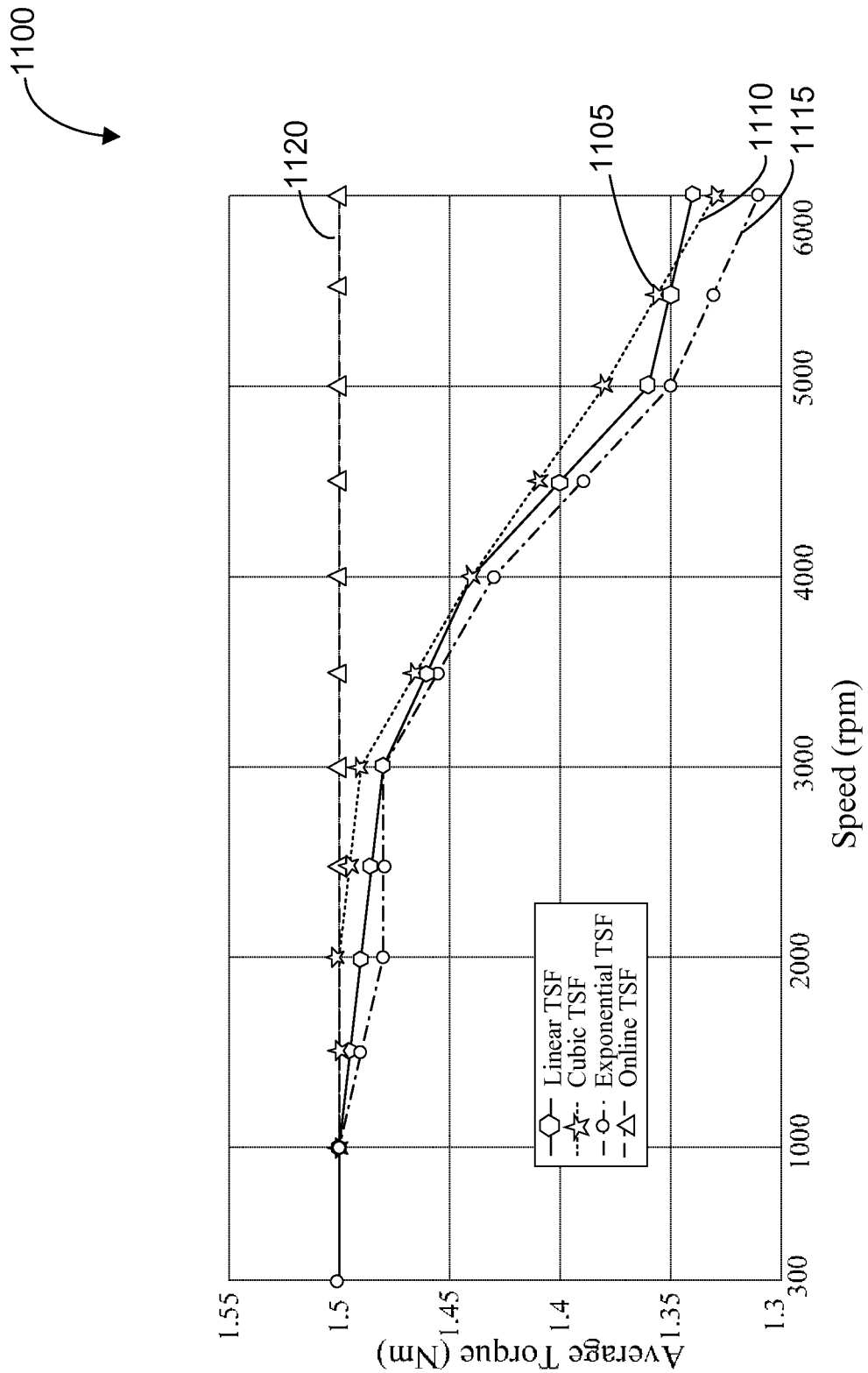
FIG. 11 illustrates a graphical representation of comparisons of average torques of different TSFs according to an example embodiment.

Reference is next made to FIG. 11, which illustrates a graphical representation 1100 of comparisons between average torques of various types of TSFs, namely linear TSF, cubic TSF, exponential TSF and online TSF, as a function of speed. Graph 1105 illustrates the relationship between average torque and speed of a SRM using linear TSF. Graph 1110 illustrates the relationship between average torque and speed of a SRM using cubic TSF. Graph 1115 illustrates the relationship between average torque and speed of a SRM using exponential TSF. Graph 1120 illustrates the relationship between average torque and speed of a SRM using online TSF.

As illustrated in FIG. 11, the average torque of conventional TSFs, such as linear TSF 1105, cubic TSF 1110 and exponential TSF 1115, is decreased as the speed increases, while the average torque of online TSF 1120 is equal to the torque reference. Although the online TSF 1120 shows slight increase in power loss, it produces higher average torque with much lower value of torque ripples.

In order to compare torque capability of different TSFs, the ratio between RMS current and average torque is introduced as (36). Lower ratio means lower power loss per average torque.

$$\text{Ratio} = \frac{I_{RMS}}{T_{av}} \quad (36)$$

Figure 12:
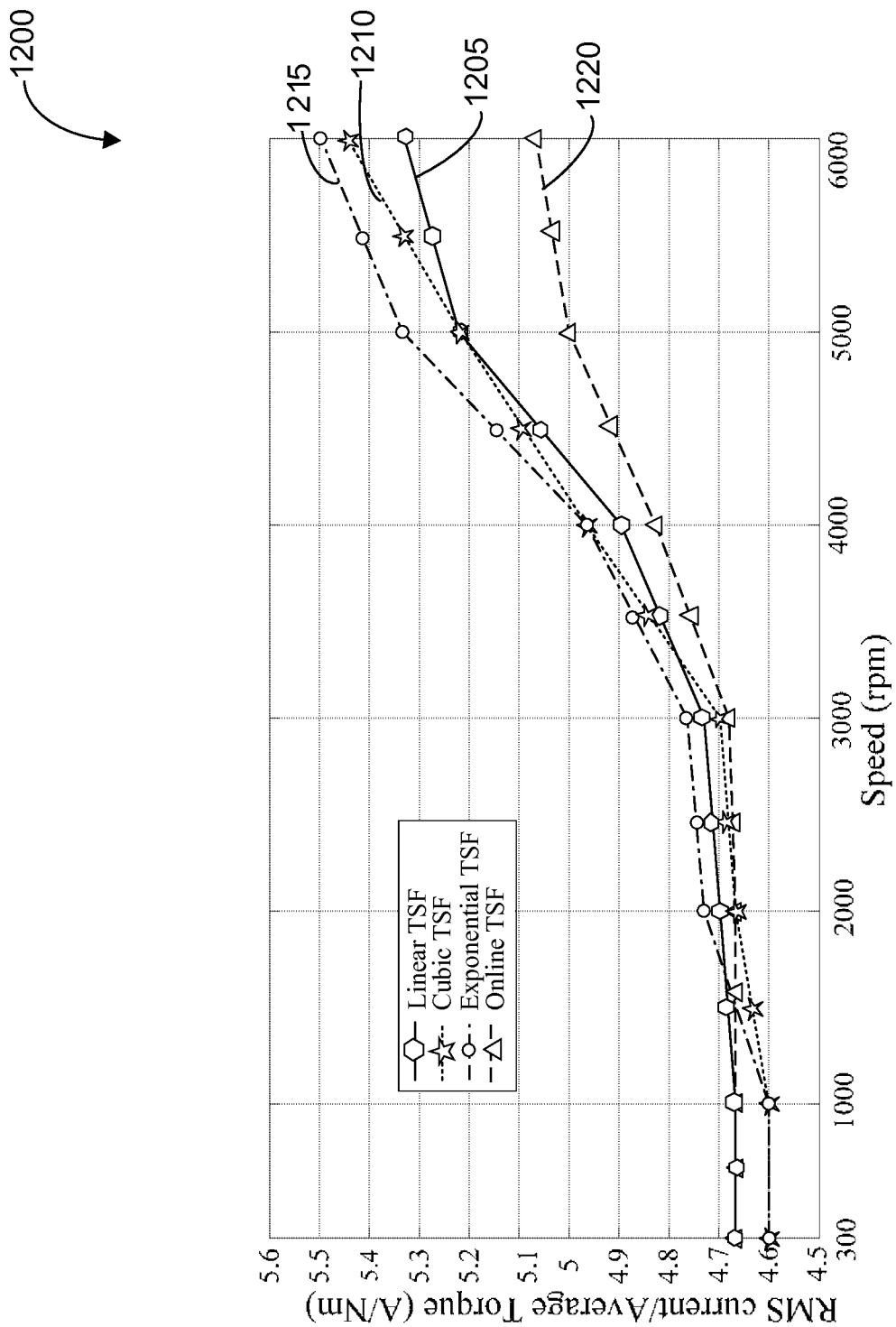
FIG. 12 illustrates a graphical representation of comparisons of ratio between RMS current and average torque of different TSFs according to an example embodiment.

Reference is next made to FIG. 12, which illustrates a graphical representation 1200 of comparisons between the ratios of (36) of various types of TSFs, namely linear TSF, cubic TSF, exponential TSF and online TSF, as a function of speed.

Graph 1205 illustrates the relationship between the ratio between RMS current and average torque and speed of a SRM using linear TSF. Graph 1210 illustrates the relationship between the ratio between RMS current and average torque and speed of a SRM using cubic TSF. Graph 1215 illustrates the relationship between the ratio between RMS current and average torque and speed of a SRM using exponential TSF. Graph 1220 illustrates the relationship between the ratio between RMS current and average torque and speed of a SRM using online TSF.

As illustrated in FIG. 12, the ratio of online TSF 1220 is close to that of conventional TSFs at speeds lower than 2000 rpm and much lower than that of conventional TSFs at higher speeds. Thus, power loss of online TSF 1220 generated for per-unit average torque is decreased compared to conventional TSFs, making online TSF a promising choice for both torque ripple reduction and efficiency improvement in SRM drives.

The graphical representations 900, 1000, 1100 and 1200 of FIG. 9, FIG. 10, FIG. 11 and FIG. 12, respectively, are based on a simulation of a 2.3 kW, 6000 rpm, three-phase 12/8 SRM model. The simulations were implemented in Matlab/Simulink by using torque as well as inductance profiles from finite element analysis (FEA). Hysteresis current control was applied to the current control loop with 0.5 A current hysteresis band. Asymmetric power electronic converter was used to simulate SRM operation under 300V DC-link voltage. The torque reference was set to be 1.5 Nm to analyze the linear operation. The torque ripple $T_{rip}$ is defined as:

$$T_{rip} = \frac{T_{max} - T_{min}}{T_{av}} \quad (37)$$

where $T_{av}$, $T_{max}$, and $T_{min}$ are the average torque, maximum torque, and minimum torque, respectively.

Reference is next made to FIGS. 13-16, which are analogous to the comparisons of FIGS. 9-12, respectively, but for a simulation of a 2.3 kW, 6000 rpm, three-phase 12/8 SRM model with the torque reference set to 3 Nm for nonlinear operation. The other simulation criteria are analogous to those of FIGS. 9-12.

Figure 13:
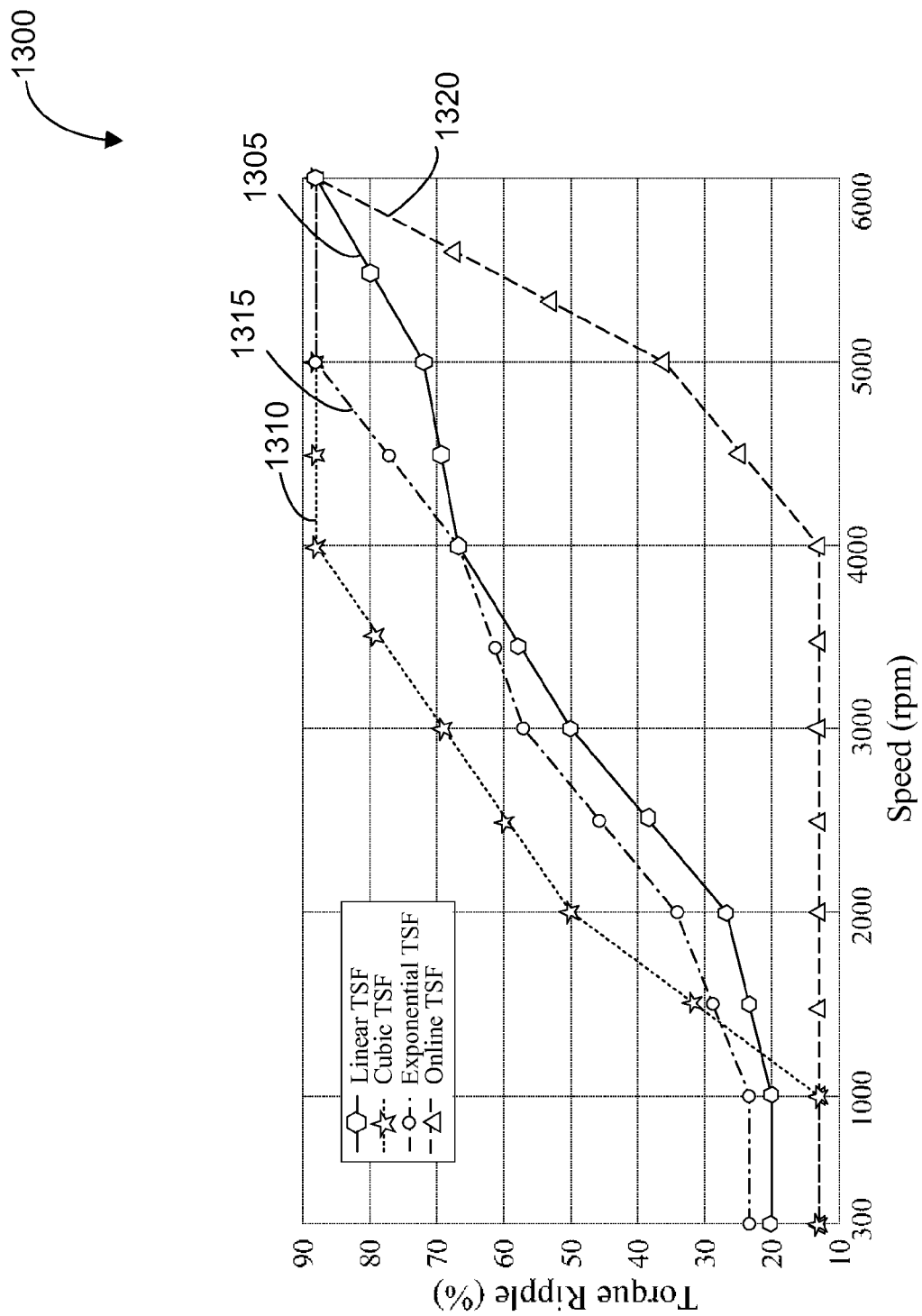
FIG. 13 illustrates a graphical representation of comparisons of torque ripples of different TSFs according to another example embodiment.

Reference is next made to FIG. 13, which illustrates a graphical representation 1300 of comparisons between torque ripples of various types of TSFs, namely linear TSF, cubic TSF, exponential TSF and online TSF, as a function of speed with the torque reference set to 3 Nm. Graph 1305 illustrates the relationship between torque ripple and speed of a SRM using linear TSF. Graph 1310 illustrates the relationship between torque ripple and speed of a SRM using cubic TSF. Graph 1315 illustrates the relationship between torque ripple and speed of a SRM using exponential TSF. Graph 1320 illustrates the relationship between torque ripple and speed of a SRM using online TSF.

As illustrated in FIG. 13, the online TSF 1320 shows no obvious increase in torque ripples as the speed increases, while, the torque ripples of conventional TSFs are greatly increased below 5000 rpm. At the speed higher than 5000 rpm, the current is uncontrolled and thus all TSFs show similar torque ripples. Among three conventional TSFs, linear TSF 1305 shows the minimum torque ripples at 4000 rpm, which are still five times as high as online TSF.

Figure 14:
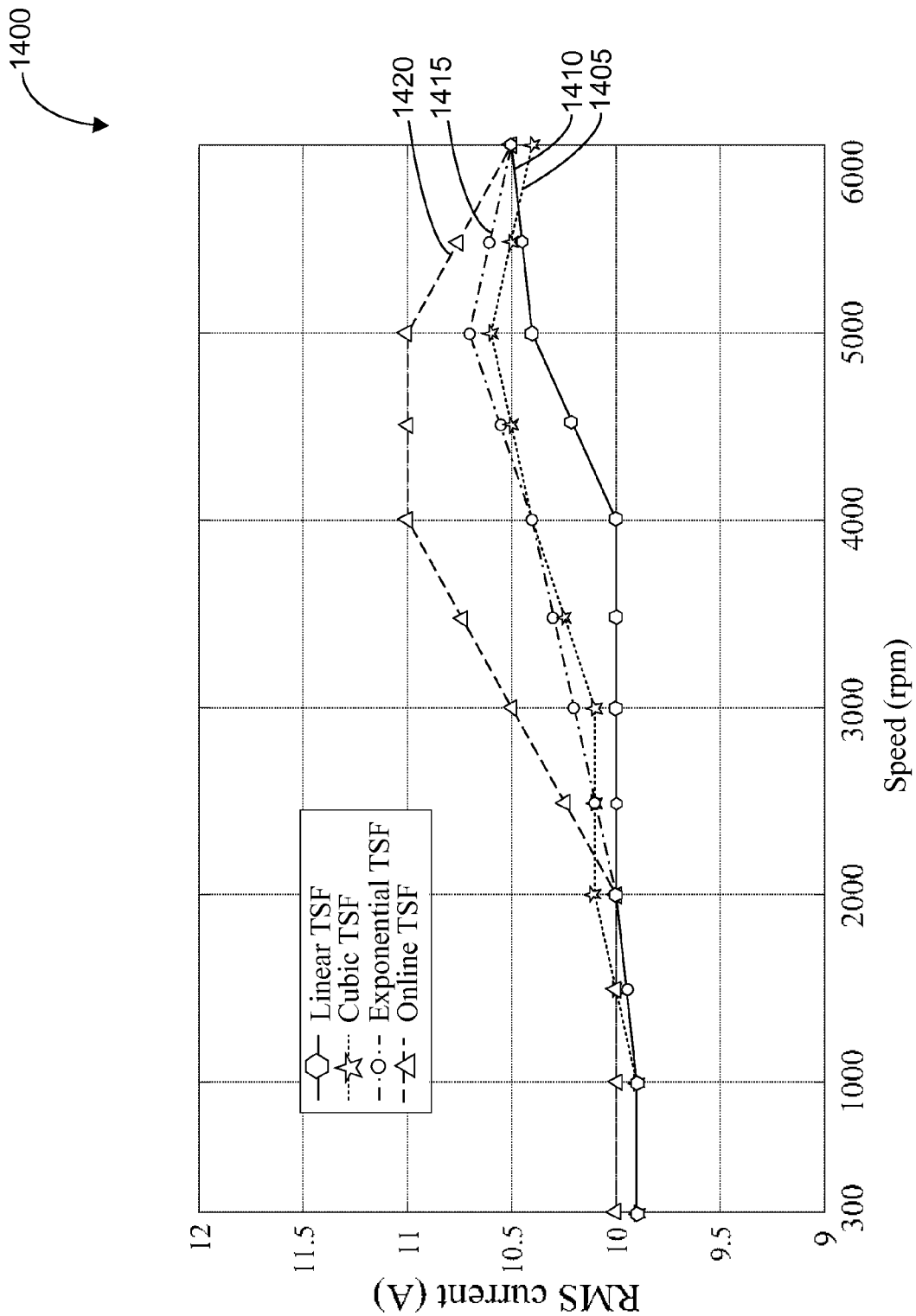
FIG. 14 illustrates a graphical representation of comparisons of RMS currents of different TSFs according to another example embodiment.

Reference is next made to FIG. 14, which illustrates a graphical representation 1400 of comparisons between RMS currents of various types of TSFs, namely linear TSF, cubic TSF, exponential TSF and online TSF, as a function of speed with the torque reference set to 3 Nm. Graph 1405 illustrates the relationship between RMS current and speed of a SRM using linear TSF. Graph 1410 illustrates the relationship between RMS current and speed of a SRM using cubic TSF. Graph 1415 illustrates the relationship between RMS current and speed of a SRM using exponential TSF. Graph 1420 illustrates the relationship between RMS current and speed of a SRM using online TSF.

Figure 15:
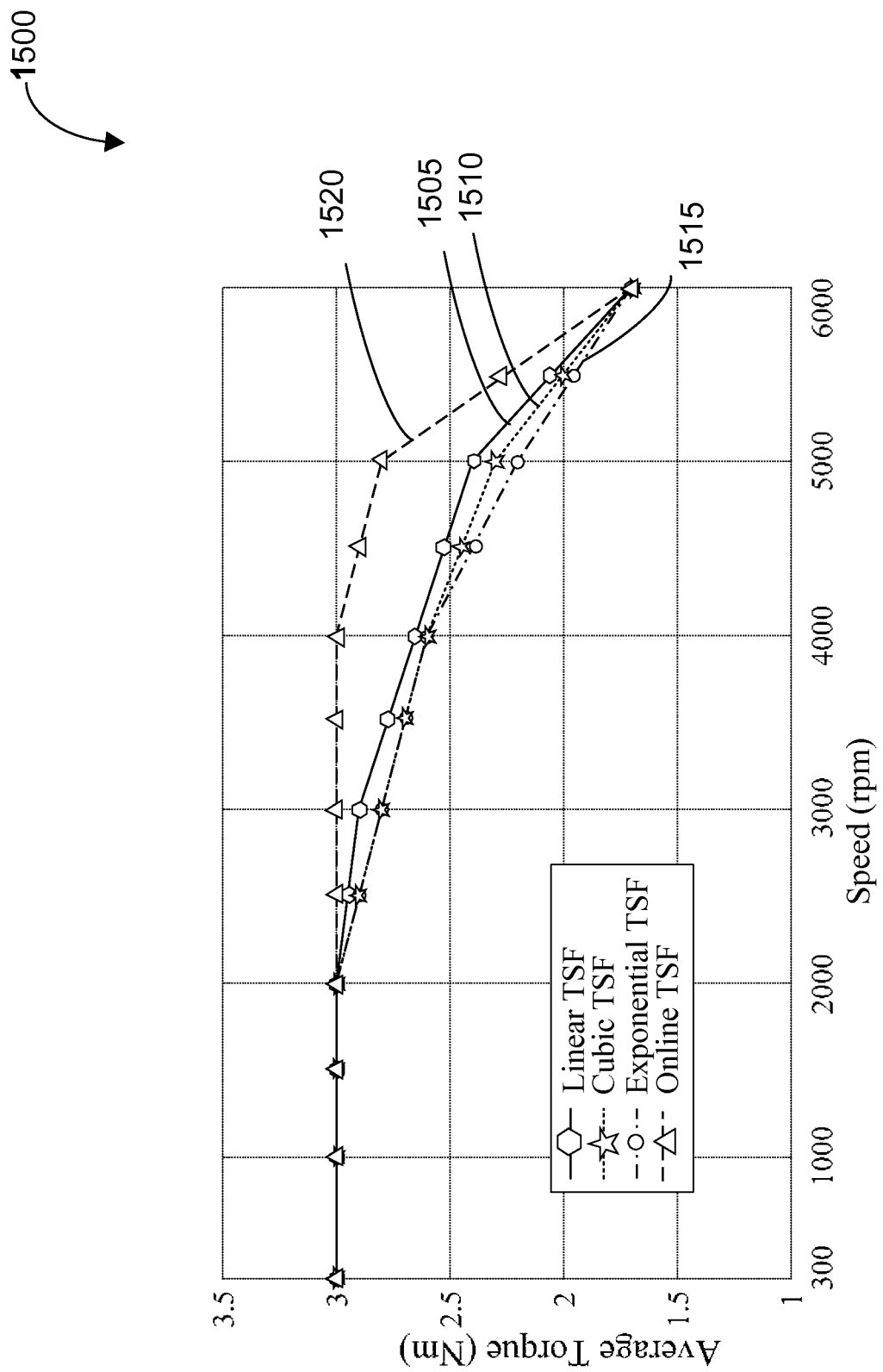
FIG. 15 illustrates a graphical representation of comparisons of average torques of different TSFs according to another example embodiment.

Reference is next made to FIG. 15, which illustrates a graphical representation 1400 of comparisons between average torques of various types of TSFs, namely linear TSF, cubic TSF, exponential TSF and online TSF, as a function of speed with the torque reference set to 3 Nm. Graph 1505 illustrates the relationship between average torque and speed of a SRM using linear TSF. Graph 1510 illustrates the relationship between average torque and speed of a SRM using cubic TSF. Graph 1515 illustrates the relationship between average torque and speed of a SRM using exponential TSF. Graph 1520 illustrates the relationship between average torque and speed of a SRM using online TSF.

Figure 16:
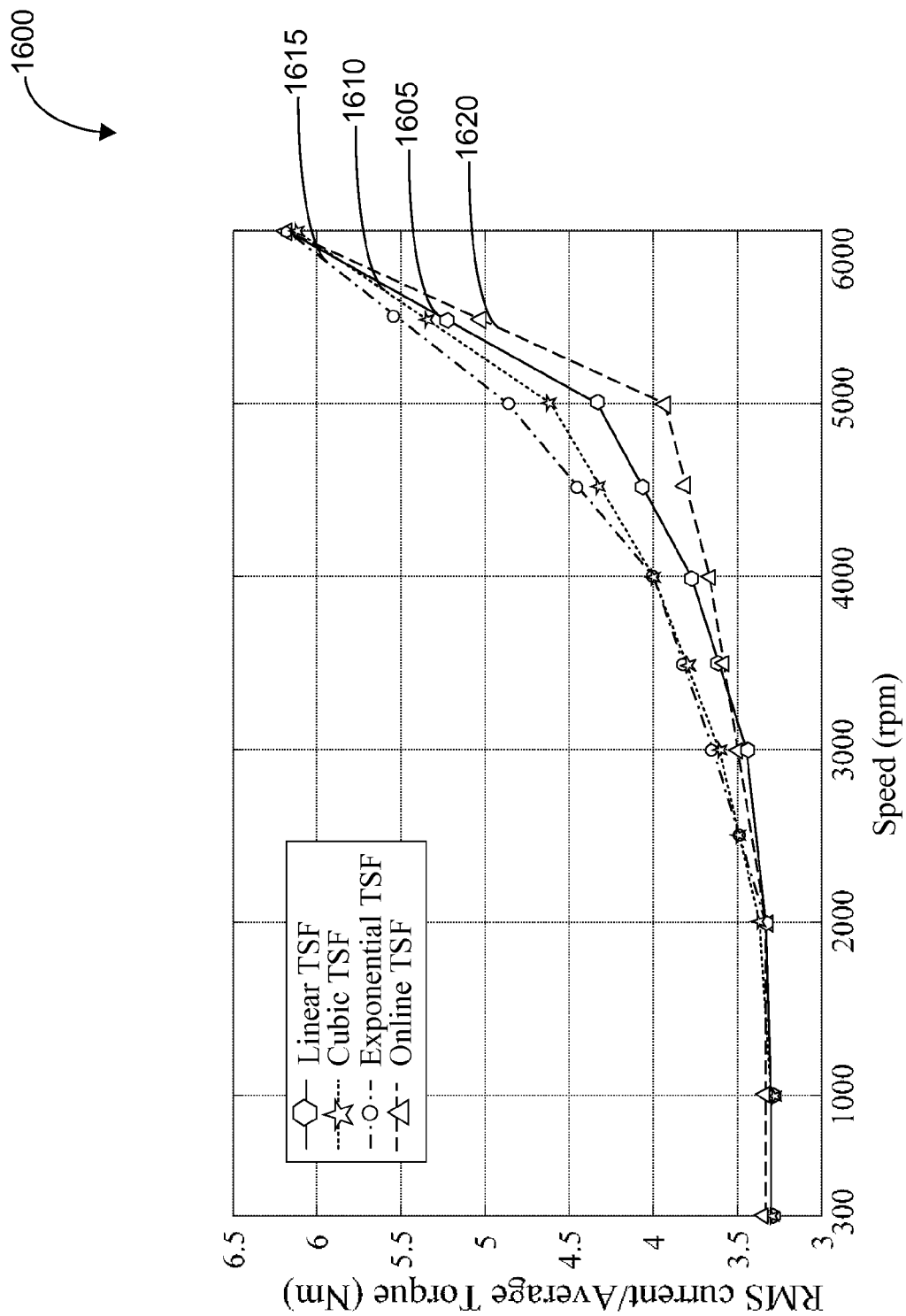
FIG. 16 illustrates a graphical representation of comparisons of ratio between RMS current and average torque of different TSFs according to another example embodiment.

Reference is next made to FIG. 16, which illustrates a graphical representation 1600 of comparisons between the ratios of (36) of various types of TSFs, namely linear TSF, cubic TSF, exponential TSF and online TSF, as a function of speed. Graph 1605 illustrates the relationship between the ratio between RMS current and average torque and speed of a SRM using linear TSF. Graph 1610 illustrates the relationship between the ratio between RMS current and average torque and speed of a SRM using cubic TSF. Graph 1615 illustrates the relationship between the ratio between RMS current and average torque and speed of a SRM using exponential TSF. Graph 1620 illustrates the relationship between the ratio between RMS current and average torque and speed of a SRM using online TSF.

As illustrated in FIGS. 14, 15 and 16, online TSF graphs 1420, 1520 and 1620 show slightly higher RMS current, higher average torque, and lower RMS current per average torque, respectively, over the wide speed range. Also, as illustrated in FIG. 15, the maximum speed of constant torque range using online TSF 1520 is increased to 4000 rpm rather than 2000 rpm in conventional TSFs. Therefore, in magnetic saturated region, the online TSF is more effective than conventional TSFs in terms of torque ripple reduction and efficiency improvement in SRM drives.

Reference is next made to FIGS. 17A, 17B, 18A, 18B and 19A, 19B, which illustrate experimental results of torque responses and current responses of online TSF at various speed and torque reference settings. The experimental results of FIGS. 17A-19B are based on a simulation of a 2.3 kW, 6000 rpm, three-phase 12/8 SRM model. For the purposes of the simulation, Altera FPGA EP3C25Q240 was used for digital implementation of the proposed online TSF. Current hysteresis band was set to be 0.5 A. DC-link voltage is set to 300V. The torque-current-rotor position characteristics were stored as look up tables in FPGA. Torque was estimated from these look-up tables by measuring the phase current and rotor position, and converted into an analog signal through digital-to-analog conversion chip in the hardware. It should be noted that the torque output of each phase could be negative. Since the selected digital-to-analog conversion chip was unipolar, 2 Nm offset has been added to the torque out of each phase and no offset has been added to total torque. The current reference of online TSF is adjusted on line according to the error between the torque reference and estimated torque.

Figure 17A:
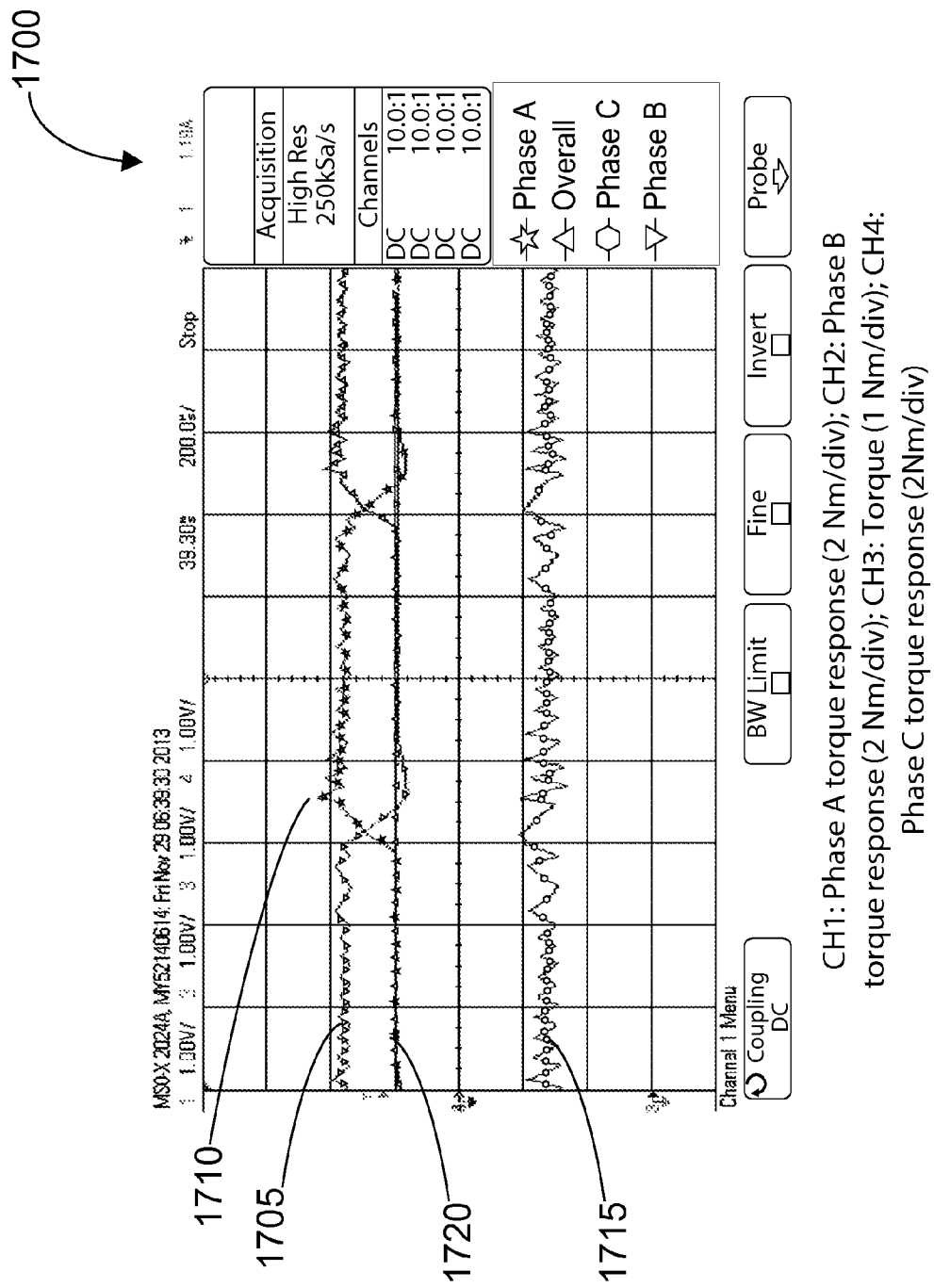
FIG. 17A illustrates a graphical representation of torque responses of different phases of a switched reluctance motor with online TSF control according to an example embodiment.

FIG. 17A illustrates a graphical representation 1700 of torque responses of each of the three phases at speed of 3000 rpm and torque reference of 1.5 Nm. Plot 1705 illustrates the torque response of phase A, plot 1710 illustrates the torque response of phase B, plot 1715 illustrates the torque response of phase C, and plot 1720 illustrates the overall torque response of the SRM.

Figure 17B:
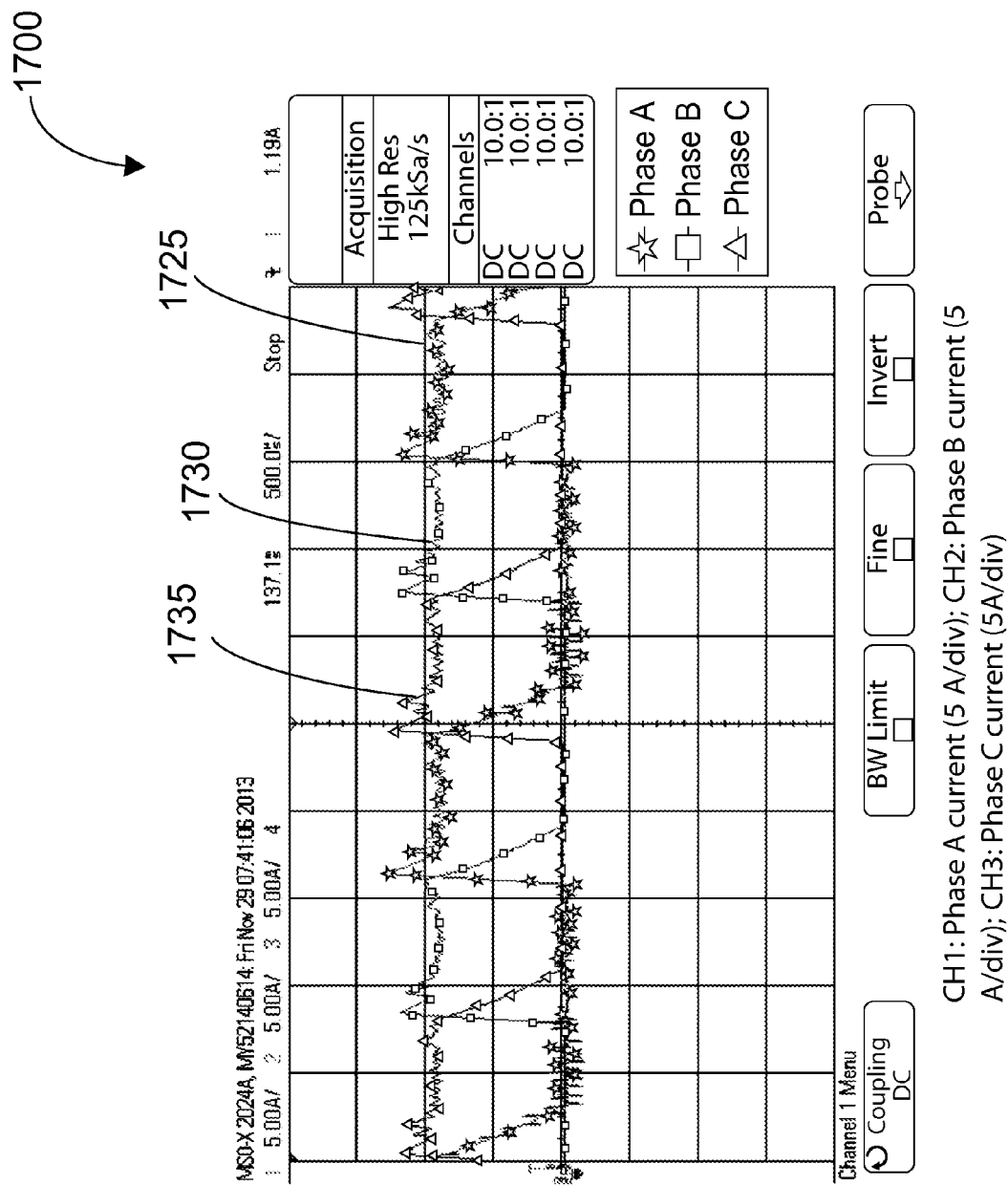
FIG. 17B illustrates a graphical representation of current responses of different phases of a switched reluctance motor with online TSF control according to an example embodiment.

FIG. 17B illustrates a graphical representation 1700 of current responses of each of the three phases at speed of 3000 rpm and torque reference of 1.5 Nm. Plot 1725 illustrates the current response of phase A, plot 1730 illustrates the current response of phase B, and plot 1735 illustrates the current response of phase C.

Figure 18A:
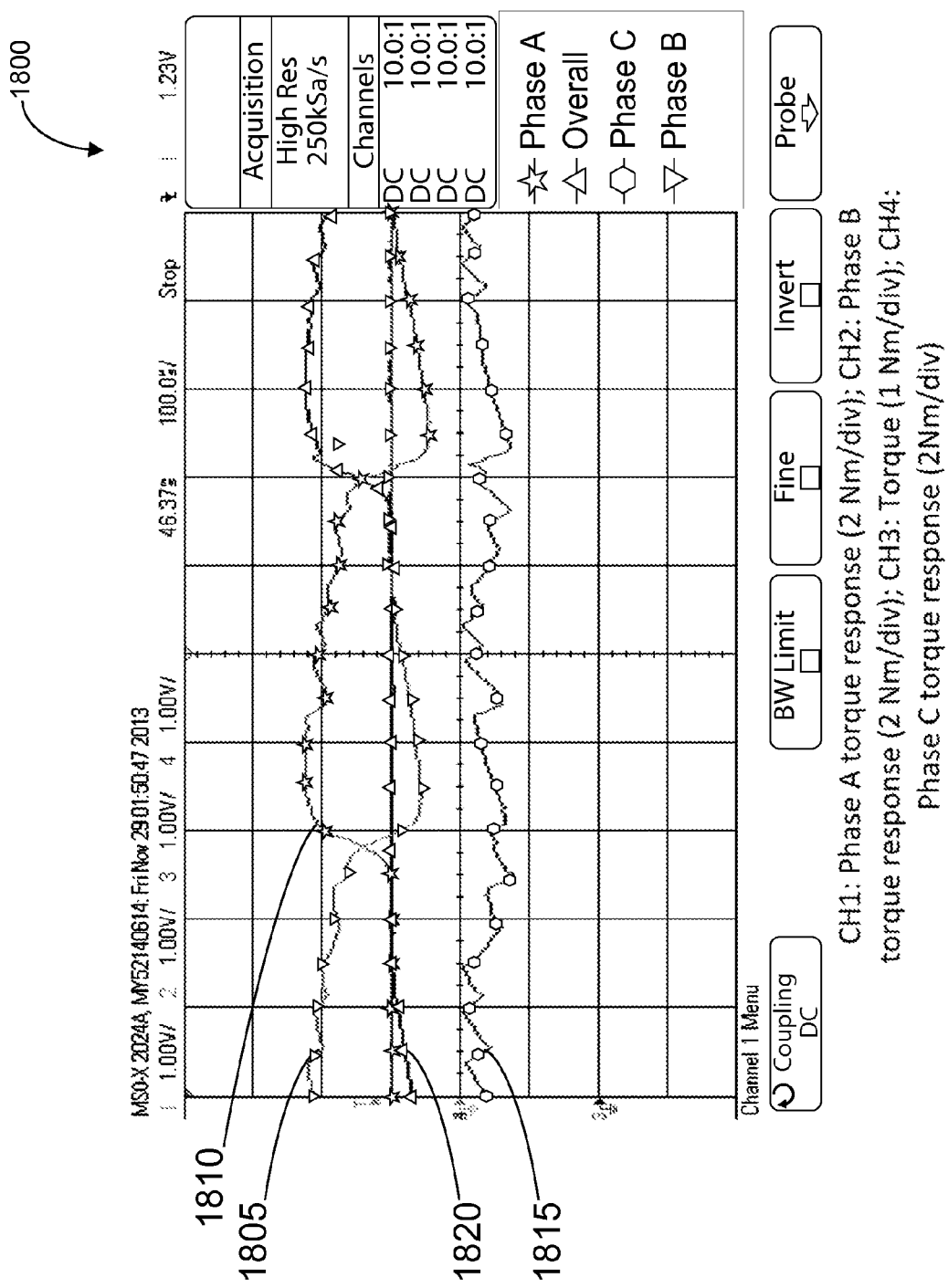
FIG. 18A illustrates a graphical representation of torque responses of different phases of a switched reluctance motor with online TSF control according to another example embodiment.

FIG. 18A illustrates a graphical representation 1800 of torque responses of each of the three phases at speed of 6000 rpm and torque reference of 1.5 Nm. Plot 1805 illustrates the torque response of phase A, plot 1810 illustrates the torque response of phase B, plot 1815 illustrates the torque response of phase C, and plot 1820 illustrates the overall torque response of the SRM.

Figure 18B:
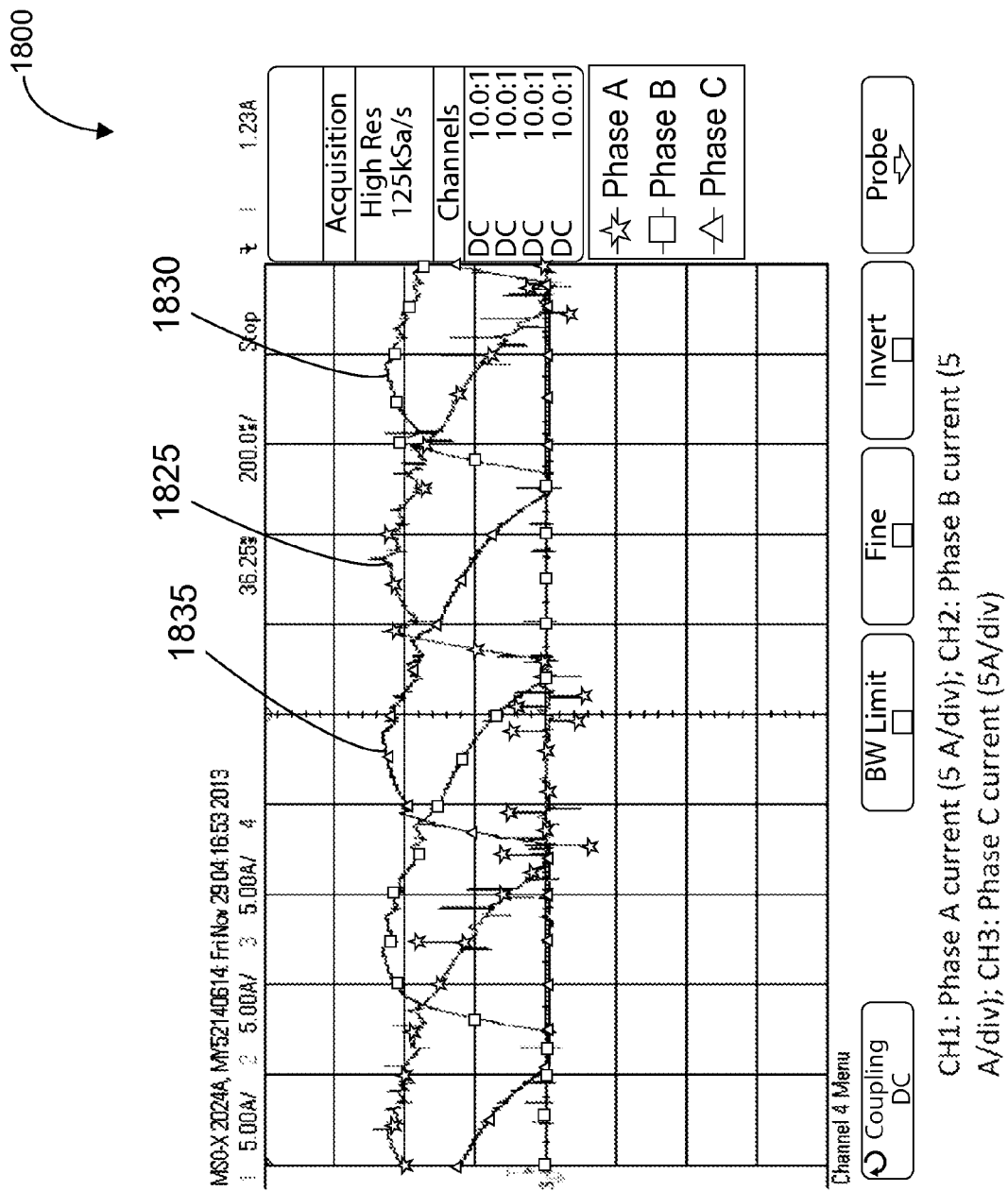
FIG. 18B illustrates a graphical representation of current responses of different phases of a switched reluctance motor with online TSF control according to another example embodiment.

FIG. 18B illustrates a graphical representation 1800 of current responses of each of the three phases at speed of 6000 rpm and torque reference of 1.5 Nm. Plot 1825 illustrates the current response of phase A, plot 1830 illustrates the current response of phase B, and plot 1835 illustrates the current response of phase C.

To evaluate the performance of online TSF both in linear magnetic region and saturated region, the experimental results are generated for torque references set to 1.5 Nm as well as 3 Nm. The experimental results illustrated in FIGS. 17A, 17B, 18A and 18B are based on the torque reference setting of 1.5 Nm. The experimental results illustrated in FIGS. 19A and 19B, discussed below, are based on the torque reference setting of 3 Nm.

Figure 19A:
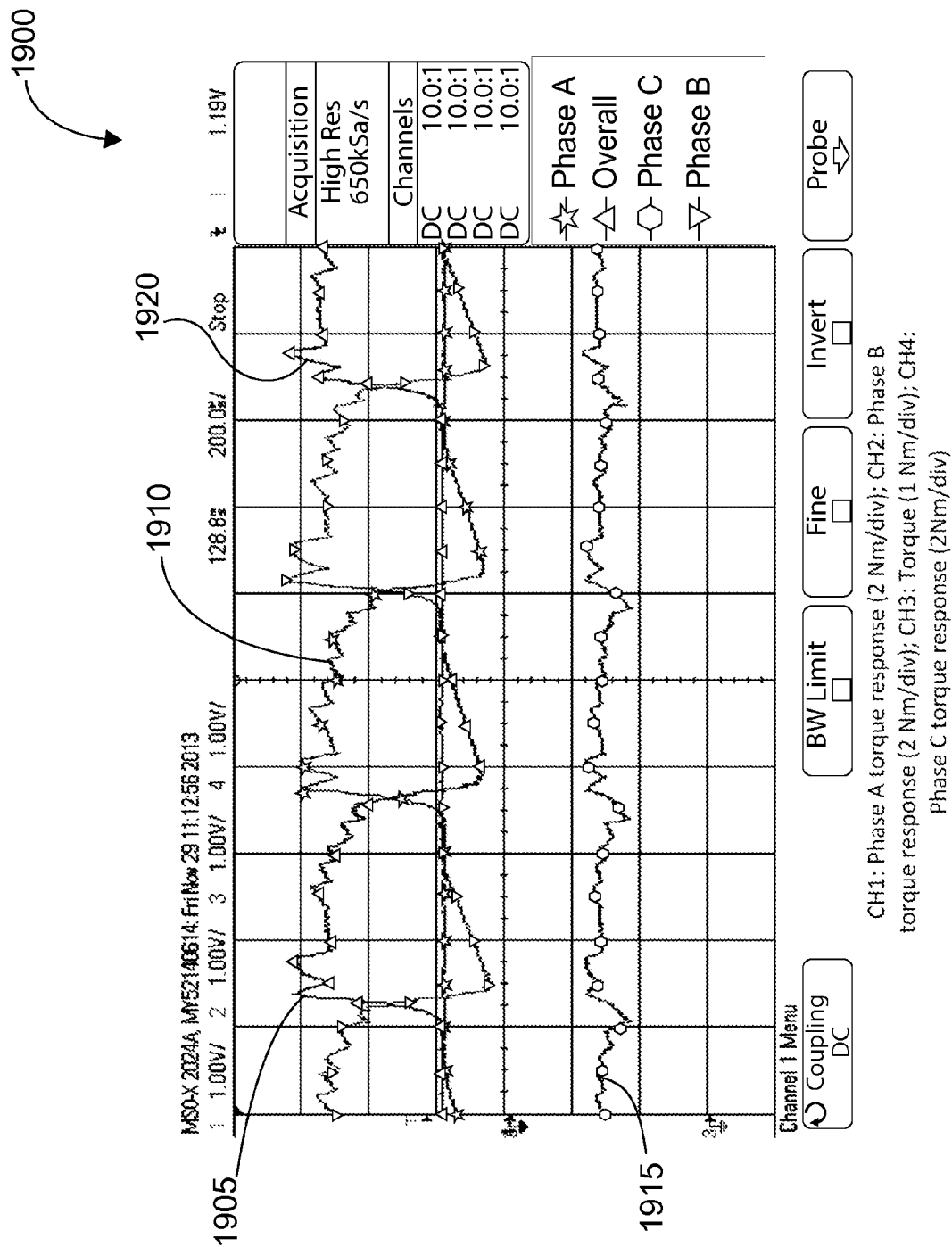
FIG. 19A illustrates a graphical representation of torque responses of different phases of a switched reluctance motor with online TSF control according to another example embodiment.

FIG. 19A illustrates a graphical representation 1900 of torque responses of each of the three phases at speed of 4000 rpm and torque reference of 3 Nm. Plot 1905 illustrates the torque response of phase A, plot 1910 illustrates the torque response of phase B, plot 1915 illustrates the torque response of phase C, and plot 1920 illustrates the overall torque response of the SRM.

Figure 19B:
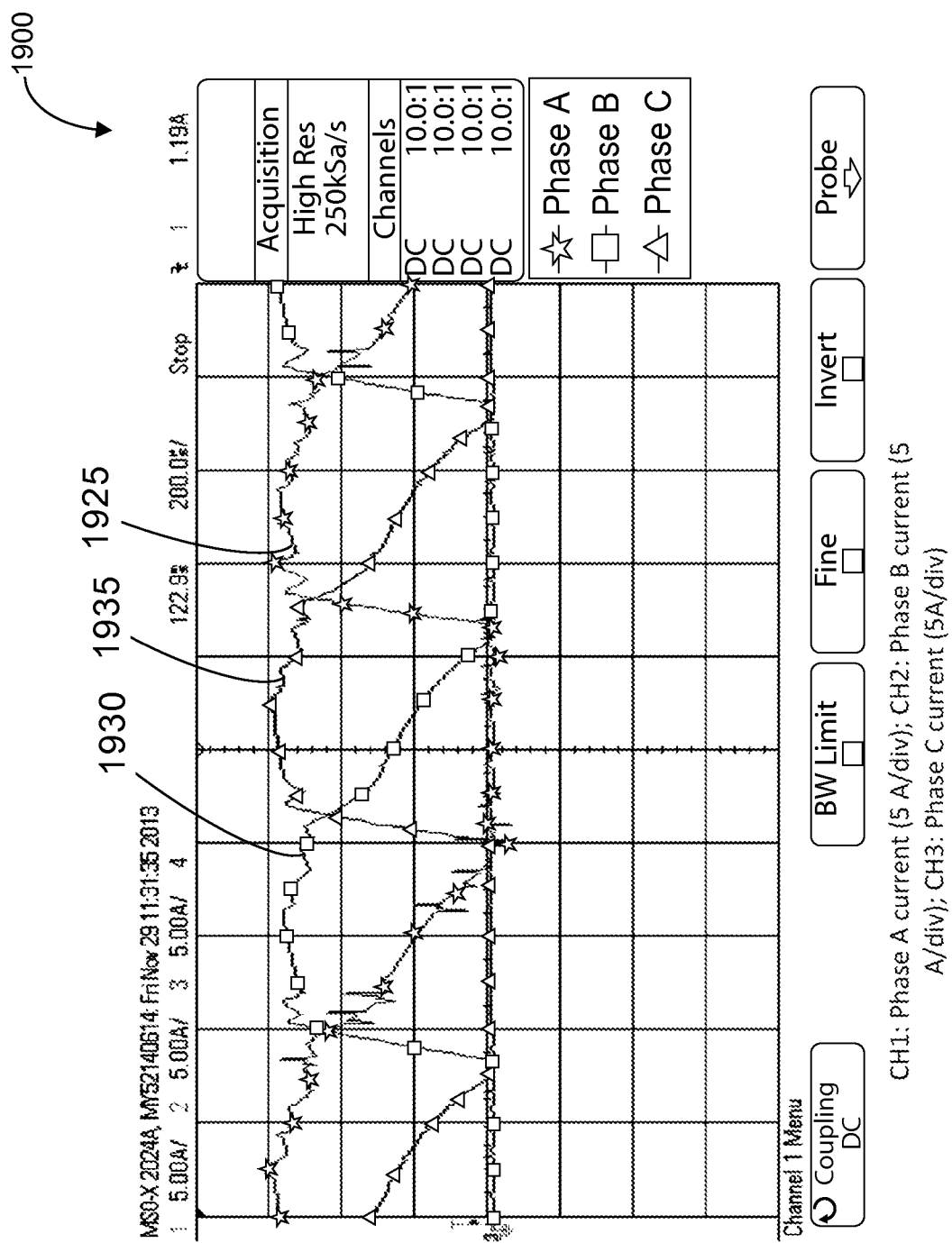
FIG. 19B illustrates a graphical representation of current responses of different phases of a switched reluctance motor with online TSF control according to another example embodiment.

FIG. 19B illustrates a graphical representation 1900 of current responses of each of the three phases at speed of 4000 rpm and torque reference of 3 Nm. Plot 1925 illustrates the current response of phase A, plot 1930 illustrates the current response of phase B, and plot 1935 illustrates the current response of phase C.

As illustrated in FIGS. 9 and 13, the torque ripples of online TSF 920 and 1320 are kept as the same level up to 6000 rpm and 4000 rpm, respectively. The experimental results of FIGS. 17A, 17B, 18A, 18B and 19A, 19B show that the online TSF produces the low torque ripples up to 6000 rpm. Therefore, the proposed online TSF is verified by experimental results at both linear magnetic region and saturated magnetic region.

The above-described embodiments and applications of the present invention are intended only to be examples. Alterations, modifications and variations may be effected to the particular embodiments by those of ordinary skill in the art, in light of this teaching, without departing from the scope of the claimed invention.

The invention claimed is:
1. A method for controlling an overall torque response of a switched reluctance motor, the method comprising:
receiving a torque reference $T_{e\_ref}$;
receiving a first total torque response $T_e$ of the switched reluctance motor via a feedback system;
determining an incoming phase torque reference and an outgoing phase torque reference; and
outputting the incoming phase torque reference and the outgoing phase torque reference to the switched reluctance motor;
wherein:
i) during a first range of rotor positions:
the incoming phase torque reference $T_{e\_ref(k)}$ is generated by a torque sharing function controller using a torque sharing function for the torque reference $T_{e\_ref}$ and a present rotor position θ for the switched reluctance motor, and
the outgoing phase torque reference is an adjusted outgoing phase torque reference $T_{e\_ref(k-1)}^{new}$ comprising a sum of an initial outgoing phase torque reference $T_{e\_ref(k-1)}$ generated by the torque sharing function controller using the torque sharing function for the torque reference $T_{e\_ref}$ and the present rotor position θ, and a compensation signal received from a compensator, the compensation signal being based on a difference between the torque reference $T_{e\_ref}$ and the first total torque response $T_e$; and
ii) during a second range of rotor positions:
the outgoing phase torque reference $T_{e\_ref(k-1)}$ is generated by the torque sharing function controller using the torque sharing function for the torque reference $T_{e\_ref}$ and the present rotor position θ; and
the incoming phase torque reference is an adjusted incoming phase torque reference $T_{e\_ref(k)}^{new}$ comprising a sum of an initial incoming phase torque reference $T_{e\_ref(k)}$ generated by the torque sharing function controller using the torque sharing function for the torque reference $T_{e\_ref}$ and the present rotor position θ, and the compensation signal.

2. The method of claim 1, wherein the first range of rotor positions corresponds to a start of commutation, and the second range of rotor positions corresponds to an end of commutation.

3. The method of claim 1, wherein, during the first range of rotor positions, a maximum absolute value of rate of change of flux linkage (ARCFL) for an outgoing phase is lower than a maximum ARCFL for an incoming phase.

4. The method of claim 1, wherein, during the second range of rotor positions, a maximum absolute value of rate of change of flux linkage (ARCFL) for an incoming phase is lower than a maximum ARCFL for an outgoing phase.

5. The method of claim 3, wherein, during the second range of rotor positions, a maximum absolute value of rate of change of flux linkage (ARCFL) for an incoming phase is lower than a maximum ARCFL for an outgoing phase.

6. The method of claim 1, wherein the compensation signal comprises a product of the difference between the torque reference $T_{e\_ref}$ and the first total torque response $T_e$ and a proportional and integral (PI) compensation factor.

7. The method of claim 6, wherein, during the first range of rotor positions, the PI compensation factor is of a general form $G_{(k-1)}(s)$, and during the second range of rotor positions, the PI compensation factor is of a general form $G_{(k)}(s)$.

8. The method of claim 7, wherein $G_{(k-1)}(s) = G_{(k)}(s) = 10 + 10/s$.

9. The method of claim 1, wherein, during the first range of rotor positions, outputting the incoming phase torque reference and the outgoing phase torque reference to the switched reluctance motor further comprises:
   determining an incoming phase current reference $i_{e\_ref(k)}$ using the incoming phase torque reference $T_{e\_ref(k)}$, the present rotor position $\theta$, and a set of torque-current-rotor position characteristics, determining an incoming phase current $i_k$ using the determined incoming phase current reference $i_{e\_ref(k)}$ and a transfer function of a general form $H_{(k)}(s)$, and
   outputting the determined incoming phase current $i_k$ to the switched reluctance motor, and
   determining an outgoing phase current reference $i_{e\_ref(k-1)}$ using the adjusted outgoing phase torque reference $T_{e\_ref(k-1)}^{new}$, the present rotor position $\theta$, and the set of torque-current-rotor position characteristics,
   determining an outgoing phase current $i_{k-1}$ using the determined outgoing phase current reference $i_{e\_ref(k-1)}$ and a transfer function of a general form $H_{(k-1)}(s)$, and
   outputting the determined outgoing phase current $i_{k-1}$ to the switched reluctance motor.

10. The method of claim 9, wherein, during the second range of rotor positions, outputting the incoming phase torque reference and the outgoing phase torque reference to the switched reluctance motor further comprises:
   determining the outgoing phase current reference $i_{e\_ref(k-1)}$ using the outgoing phase torque reference $T_{e\_ref(k-1)}$, the present rotor position $\theta$, and the set of torque-current-rotor position characteristics,
   determining the outgoing phase current $i_{k-1}$ using the determined outgoing phase current reference $i_{e\_ref(k-1)}$ and the transfer function of a general form $H_{(k-1)}(s)$, and
   outputting the determined outgoing phase current $i_{k-1}$ to the switched reluctance motor; and
   determining the incoming phase current reference $i_{e\_ref(k)}$ using the adjusted incoming phase torque reference $T_{e\_ref(k)}^{new}$, the present rotor position $\theta$, and the set of torque-current-rotor position characteristics,
   determining the incoming phase current $i_k$ using the determined incoming phase current reference $i_{e\_ref(k)}$ and the transfer function of a general form $H_{(k)}(s)$, and
   outputting the determined incoming phase current $i_k$ to the switched reluctance motor.

11. The method of claim 1, wherein, during the second range of rotor positions, outputting the incoming phase torque reference and the outgoing phase torque reference to the switched reluctance motor further comprises:
   determining an outgoing phase current reference $i_{e\_ref(k-1)}$ using the outgoing phase torque reference $T_{e\_ref(k-1)}$, the present rotor position $\theta$, and a set of torque-current-rotor position characteristics,
   determining an outgoing phase current $i_{k-1}$ using the determined outgoing phase current reference $i_{e\_ref(k-1)}$ and a transfer function of a general form $H_{(k-1)}(s)$, and
   outputting the determined outgoing phase current $i_{k-1}$ to the switched reluctance motor; and
   determining an incoming phase current reference $i_{e\_ref(k)}$ using the adjusted incoming phase torque reference $T_{e\_ref(k)}^{new}$, the present rotor position $\theta$, and the set of torque-current-rotor position characteristics,
   determining an incoming phase current $i_k$ using the determined incoming phase current reference $i_{e\_ref(k)}$ and a transfer function of a general form $H_{(k)}(s)$, and
   outputting the determined incoming phase current $i_k$ to the switched reluctance motor.

* * * * *